US009123024B2

(12) United States Patent
LeVine et al.

(10) Patent No.: US 9,123,024 B2
(45) Date of Patent: Sep. 1, 2015

(54) SYSTEM FOR ANALYZING SECURITY COMPLIANCE REQUIREMENTS

(75) Inventors: Richard B. LeVine, Marston Mills, MA (US); Patrick J. Joyce, Stoneham, MA (US); Stirling T. Goetz, Venice, CA (US); Paul M. Barsamian, Glenview, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/405,229

(22) Filed: Feb. 24, 2012

(65) Prior Publication Data

US 2013/0226662 A1    Aug. 29, 2013

(51) Int. Cl.
*G06Q 10/00* (2012.01)
*G06Q 30/00* (2012.01)
*G06Q 10/10* (2012.01)
*G06Q 10/06* (2012.01)

(52) U.S. Cl.
CPC ............ *G06Q 10/10* (2013.01); *G06Q 10/0635* (2013.01)

(58) Field of Classification Search
CPC .................................................. G06Q 10/0635
USPC ................................................ 705/7.11–7.42
See application file for complete search history.

(56) References Cited

U.S. PATENT DOCUMENTS

| 2002/0184068 | A1* | 12/2002 | Krishnan et al. ................... 705/8 |
| 2004/0107124 | A1* | 6/2004 | Sharpe et al. ..................... 705/7 |
| 2006/0184996 | A1* | 8/2006 | Condon .......................... 726/2 |
| 2008/0033886 | A1* | 2/2008 | Witz ........................... 705/36 R |
| 2008/0262863 | A1* | 10/2008 | Stickley et al. .................... 705/1 |
| 2009/0012800 | A1* | 1/2009 | Devarakonda et al. ........... 705/1 |
| 2009/0089195 | A1* | 4/2009 | Salomon et al. ................ 705/35 |
| 2009/0119141 | A1* | 5/2009 | McCalmont et al. ............. 705/7 |
| 2009/0319312 | A1* | 12/2009 | Moerdler et al. ................. 705/7 |
| 2011/0029351 | A1* | 2/2011 | Intemann et al. ................. 705/9 |
| 2011/0106731 | A1* | 5/2011 | Pearson et al. .................. 706/11 |
| 2011/0246382 | A1 | 10/2011 | Allen |

OTHER PUBLICATIONS

Examination Report No. 1 issued in Australian Patent Application No. 2014280991 on Feb. 25, 2015, 3 pages.
Examination Report No. 1 issued in Australian Patent Application No. 2013201034 on Apr. 4, 2013, 4 pages.
Examination Report No. 2 issued in Australian Patent Application No. 2013201034 on Mar. 27, 2014, 3 pages.

* cited by examiner

*Primary Examiner* — Sujay Koneru
(74) *Attorney, Agent, or Firm* — Brinks Gilson & Lione

(57) ABSTRACT

A system for analyzing security compliance requirements analyzes a linked database that includes data from the Unified Compliance Framework™. The system generates a tiered question structure to obtain information about a particular business offering, wherein questions of a particular tier are based on answers to questions of a preceding tier. Based on the information, the system generates a query and submits the query to the linked database. The query results provide a list of security compliance requirements, leading practices, and/or regulations applicable to the business offering.

17 Claims, 27 Drawing Sheets

Report for Project ,9/21/2011

Wed 21-09-2011 17:47
John Doe

Message | Excel Report-Detailed Requirements_project-name.xls

Hello John Doe,

The system report below has been generated for review.

Report Details:

| Date Initiated | 8/31/2011 |
| Client Name | Client |
| Project Name | Project |
| Primary Contact | Contact |
| Client Account Lead | Client Contact |
| SAP Opportunity Number | 097531 |

Report Summary:

- 32 Regulations to comply with 643 Requirements
- 6 Accenture Security Offerings

Detailed Report:
Details of the applicable security requirements are available in the attached spreadsheet.

* This email was generated from the analysis system – please do not reply to this email *

SYSTEM FOR ANALYZING SECURITY COMPLIANCE REQUIREMENTS

BACKGROUND

1. Technical Field

This application relates to security compliance. In particular, this application relates to a system for building a security compliance framework customized to a business offering.

2. Related Art

The Unified Compliance Framework™ (UCF) is a compliance database that harmonizes controls from hundreds of international regulatory requirements, standards, and guidelines (such as HIPAA, ISO 17799, PCI, FDA, SOX, etc.) into a single, hierarchal framework. Each of these regulations publishes a list of standards or controls that affected companies must comply with. These lists (also referred to as "authority documents") contain thousands of statements stating how information should be protected, monitored, or presented. Accurately determining which of the hundreds of requirements, standards, and guidelines of the UCF are applicable to a particular business offering can be challenging and time consuming.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

FIGS. 5-12 illustrate interfaces generated by security compliance analysis system for analyzing security compliance requirements as part of the Create New Report option shown in FIG. 4.

FIGS. 17-27 illustrate additional interfaces generated by a system for analyzing security compliance requirements security compliance analysis systems part of the Enter Admin Console option shown in FIG. 4.

DETAILED DESCRIPTION

Figure 1:
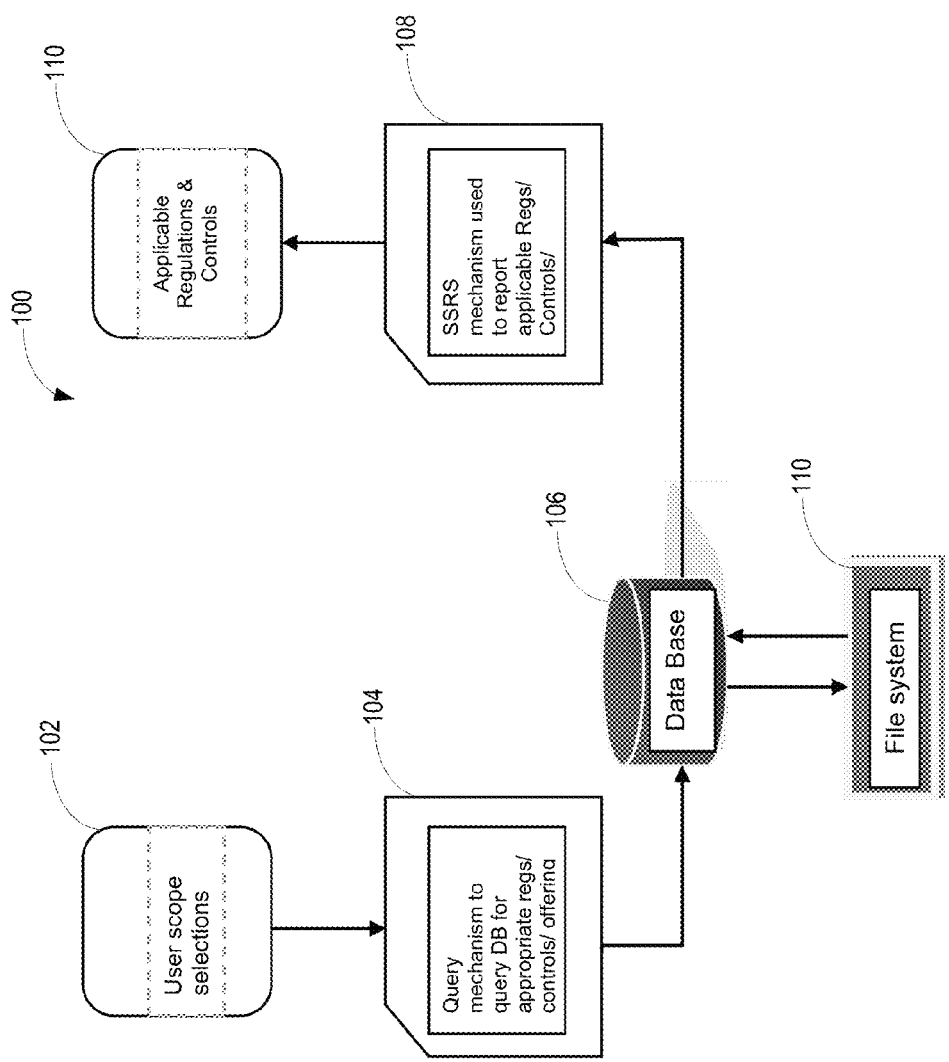
FIG. 1 shows an example of a method and process flow by which a system for analyzing security compliance requirements security compliance analysis system analyzes client data and derives the applicable industry standard/and or regulatory security compliance requirements.

FIG. 1 shows an example of a method and process flow 100 by which a system for analyzing security compliance requirements security compliance analysis system analyzes client data and derives the applicable industry standard/and or regulatory security compliance requirements.

The system obtains scope selections 102 from a user that defines the scope of a business offering (e.g., location and geography, line of business, etc). Based on the scope selections, the system generates a custom set of questions to be presented to the user. The system generates a query 104 based on the scope selections and answers to the custom set of questions. The query is submitted to a database 106 to extract relevant security regulations, relevant leading practices, and other compliance requirements corresponding to the business offering. The database includes linked data imported from the UCF. The database may also include regulations that are internal to the business linked with the UCF data. The system may implement a SQL Server Reporting Services (SSRS) mechanism 108 to report the query results 110 to the user. In this manner, the system effectively analyzes a business offering to determine the relevant industry and internal regulations, standards, and leading practices for the specific business offering. The applicable data that is fetched from the database may be stored on a file system 110, or intermediate storage, at an instance where authentication is required to process a final report, such as a report generated in an Excel® format. For generated reports the database may be integrated to a front end UI.

The disclosed methods, processes, programs, and/or instructions may be encoded in a signal-bearing medium, a computer-readable medium such as a memory, programmed within a device such as on one or more integrated circuits, or processed by a controller or a computer processor. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

Figure 2:
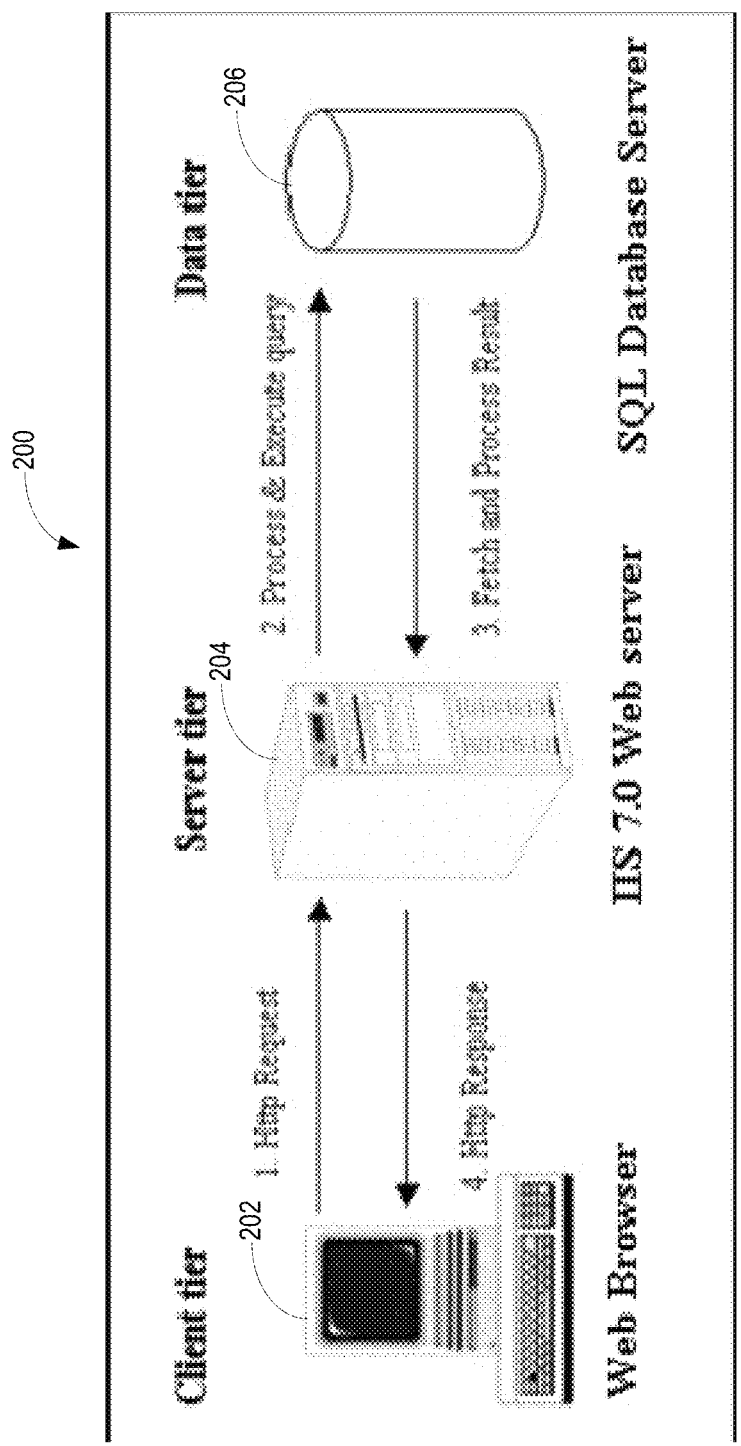
FIG. 2 shows an example of a three-tiered architecture 200 used by a security compliance analysis system.

FIG. 2 shows an example of a three-tiered architecture 200 used by a security compliance analysis system. The architecture 200 includes a client tier 202, a server tier 204 and a data tier 204. An end user interacts with the security compliance analysis system for analyzing security compliance requirements through a web browser at the client tier 202. The client tier 202 sends user requests to the server tier 204 and received responses from the server tier 204 through the web browser. The server tier 204 includes a web server (e.g., an IIS 7.0 Web server) that, after receiving a request from the client server 202 through the web browser, validates the request and processes a query to the data tier 206. The server tier 204 may include a computer processor and memory that includes instructions or computer programs that, when executed, cause the computer processor to perform the operations of the system described herein. The server tier 204 obtains results from the data tier 206 and sends the results to the client tier 202 for presentation to the end user. The server tier 204 may include one or more computer processors and one or more memories in communication with the one or more computer processors. The one or more memories include instructions and programs that, when executed, cause the computer processor to perform the functions of the security compliance analysis system for analyzing security compliance requirements described below, including rendering the webpages and interfaces described below.

The data tier 206 may include a SQL database server that executes the query received from the server tier 204 and/or procedures stored in the SQL database server and that sends the process results to the server tier 204. The data tier 206 stores data imported from the Unified Compliance Framework™ (UCF). The UCF data reflect information found in hundreds of authority Documents used to create the UCF. Data from the UCF is populated into tables stored on the SQL database server with details of authority documents and related control requirements. The UCF data, which is available in XML format, may be imported to the SQL database server using a batch file (.bat). The tables stored in the SQL database server include data related to authority documents, assets lists, citations lists, roles lists, metrics lists, etc. With knowledge from the UCF data, appropriate tables stores in the database are linked together.

Figure 3:
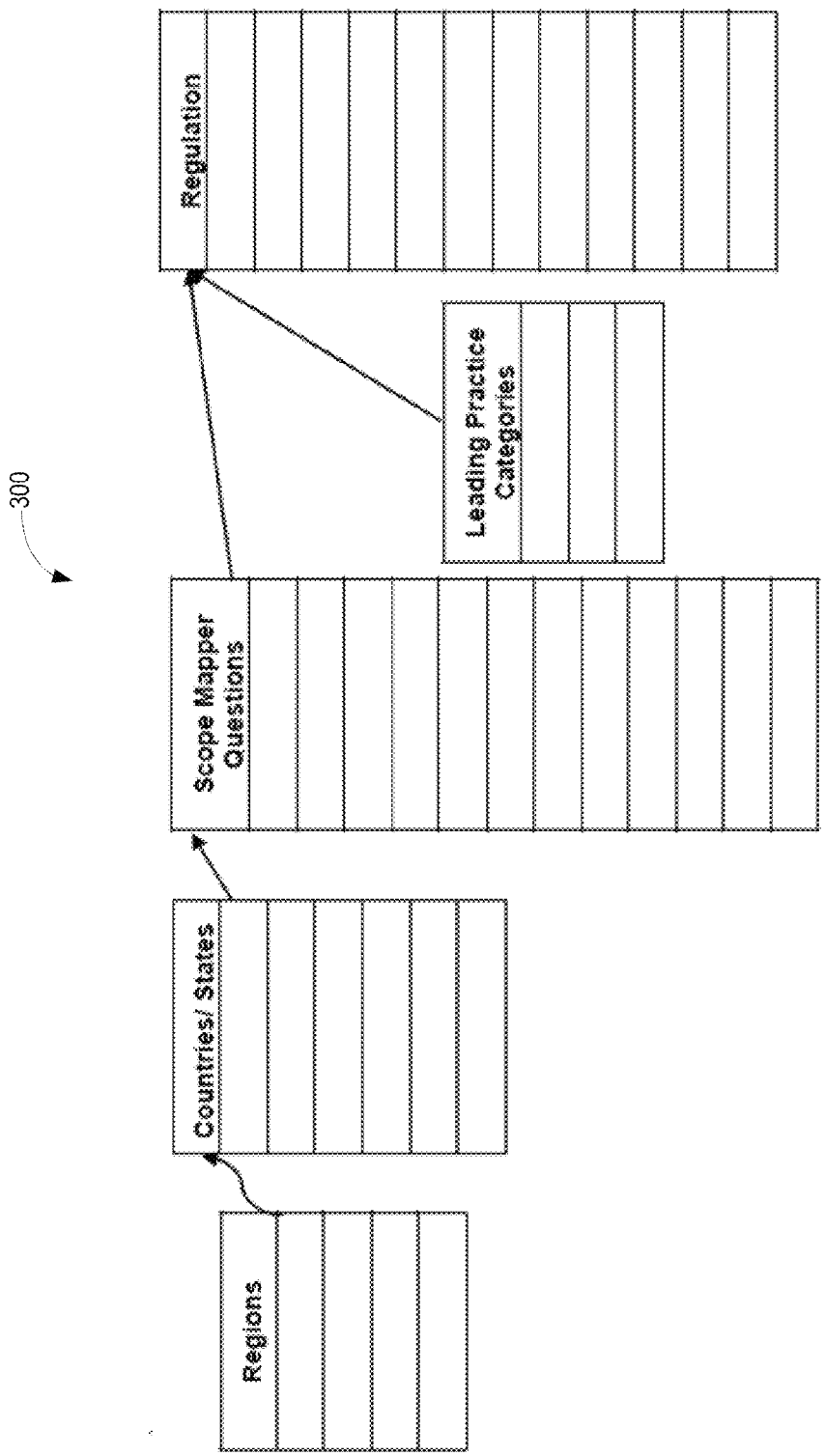
FIG. 3 shows an example of table mapping in the SQL database server.

FIG. 3 shows an example of table mapping 300 in the SQL database server 206. In this example, the tables in the database are mapped in the following hierarchy: regions—countries/states scope mapper questions—regulations. Based on scope selections (multi regional/regional/leading practices) made by the user, a customized questionnaire is presented through the interface in custom data grids. The user responds to applicable questions that are tracked down to the database.

On selection of a specific region from the region list on a Client Regions page, region specific questions along with multi regional questions are populated in two different pages on the user interface and on the user response. A particular question is mapped to the right regulation in the regulation table of the database.

The tables in the database include regions, countries, states, questionnaires, and regulations tables. When user selects a particular region corresponding table(s) are retrieved from the database; the server tier runs a SQL query as all the countries of that particular region will be selected from the countries table and on selecting a particular country, all the states of that particular country will get populated from the state table.

The questionnaire table and regulation table are mapped on the unique ID's corresponding to the imported UCF data. Questions are displayed for the user to select the response to each of the questions listed to determine the set of regulations that are applicable. The analysis system may implement a decision tree structure that links the questions with possible answers such that subsequent questions are based on the answer given. In this manner the system is able to define the business offering and hone in on the relevant regulations, standards, requirements, leading practices, etc. among the large amount of UCF data.

Returning to FIG. 2, the tables stored in the SQL database server include authority documents in-depth reports that provide comprehensive information about each of the individual authority documents tracked by the UCF. Each in-depth report provides an overview of the authority document, the types of controls (behavioral, procedural, configuration, etc.) and how the controls are mapped within the UCF. A complete list of the authority document's citations and citation guidance for the specific controls is references in the UCF. Authority documents and the corresponding reports are named in the database using the unique UCF authority document ID.

Based on scope selections obtained from the client tier 202 that define a scope of a business offering (e.g., location and geography, line of business, etc.), the server tier 204 generates a query and submits the query to the data tier 206. Based on the query, the applicable regulations are identified from the tables in the database and provided to the client tier 202. As shown in FIG. 2, communication between the client tier 202 and the server tier 204 may be through http.

Figure 4:
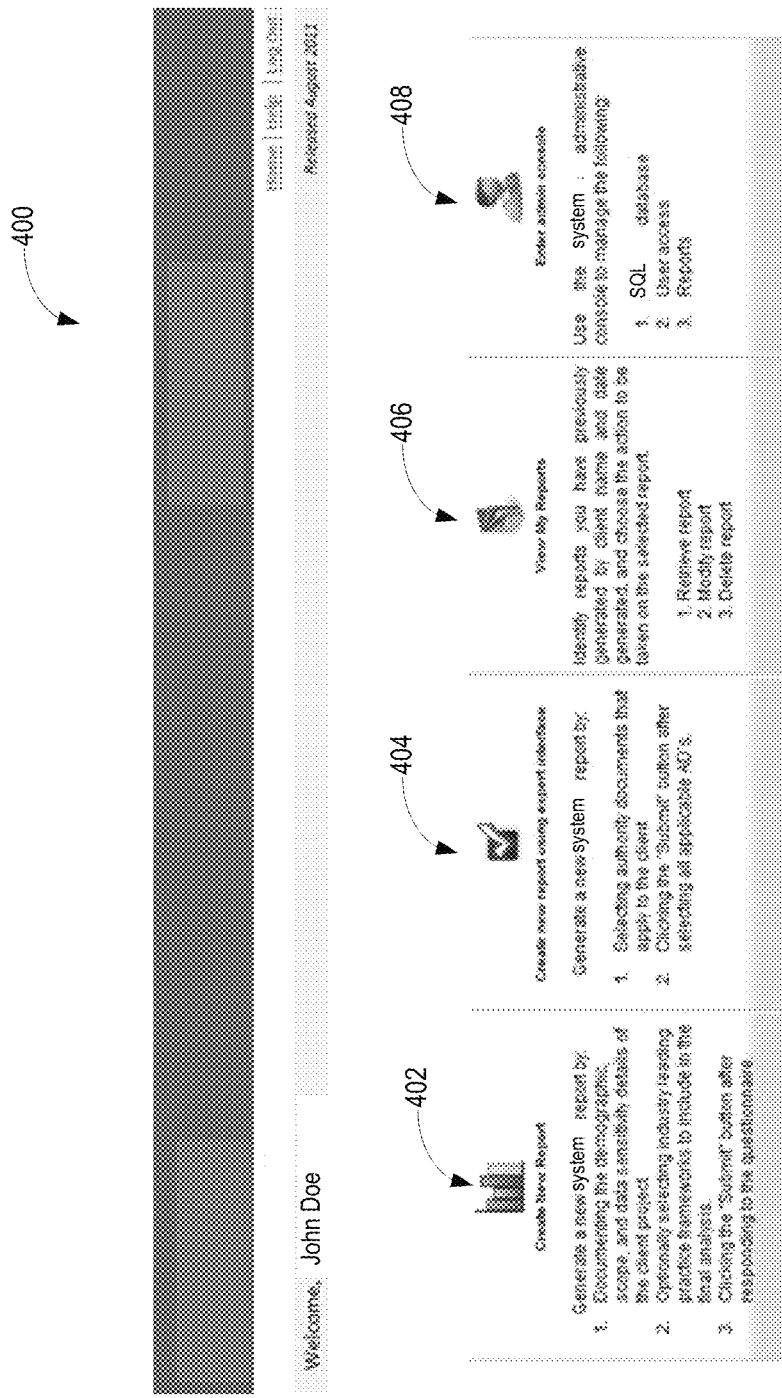
FIG. 4 shows an example of a user interface rendered by a system for analyzing security compliance requirements.

FIG. 4 shows an example of a user interface 400 rendered by a system for analyzing security compliance requirements ("security compliance analysis system"). After logging in, a user may be presented with the following options: Create New Report 402; Create New Report Using Expert Interface 404; View My Reports 406; and Enter Admin Console 408.

The Create New Report 402 option is described below with respect to FIGS. 5-12. The Create New Report Using Expert Interface 404 option is described below with respect to FIG. 13. The View My Reports 406 option is described below with respect to FIG. 14. The Enter Admin Console 408 option is described below with respect to FIGS. 15-27.

Figure 5:
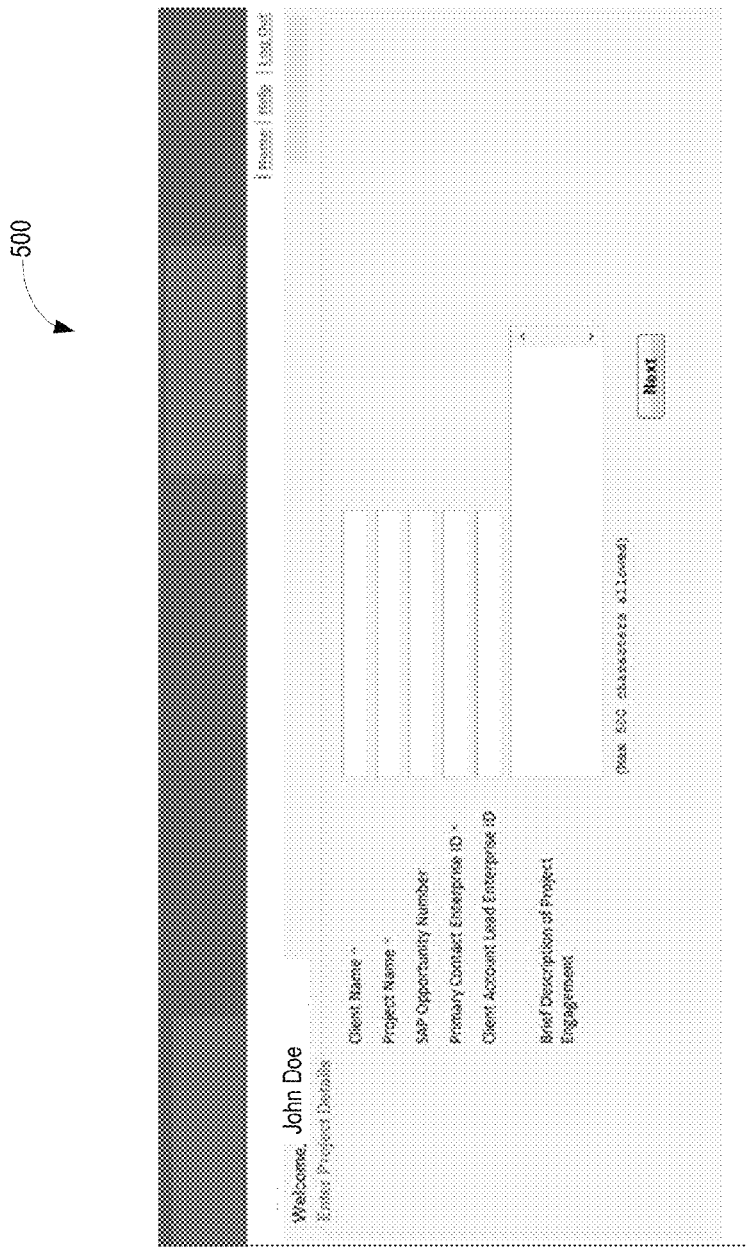
Figure 6:
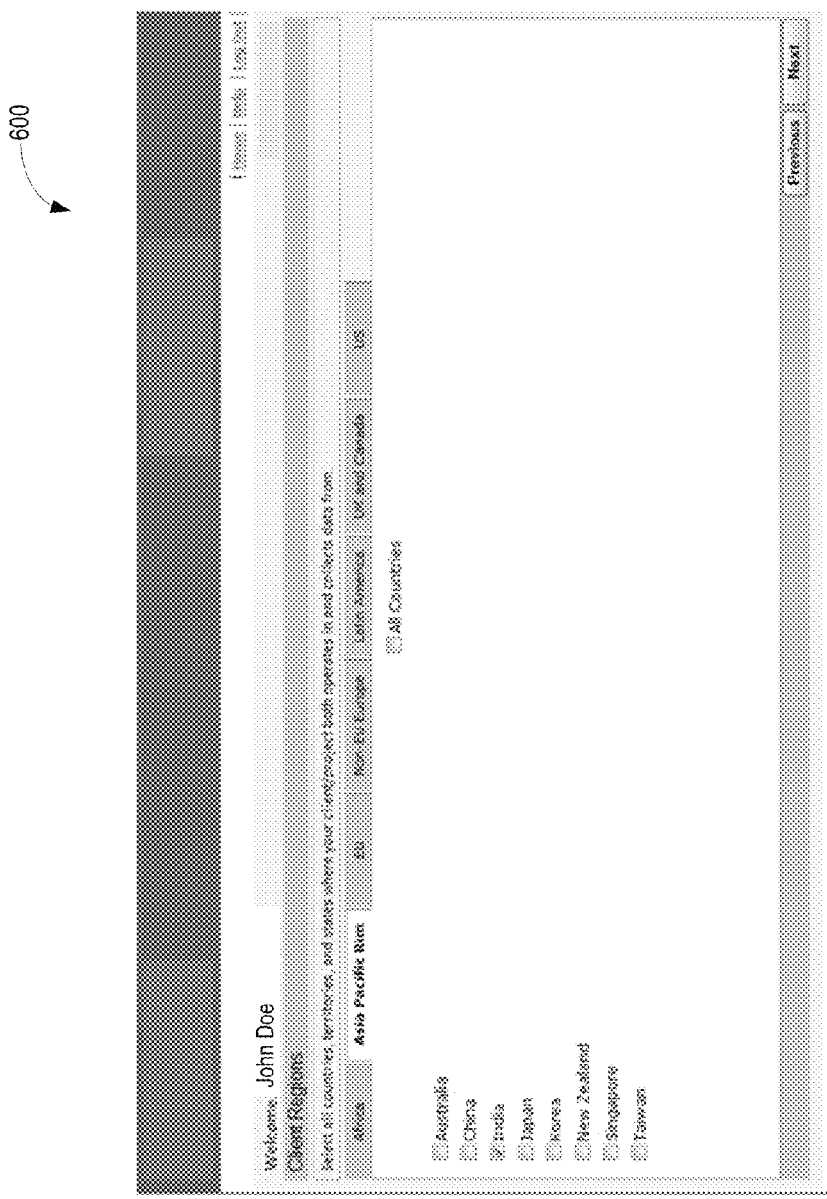

A user that selects the "create new report" option in the interface 400 may be presented with the interface shown in FIG. 5. The interface 500 includes fields in which the user inputs contact information, project details and a description of the project engagement. After the user selects the 'next' option, the security compliance analysis system security compliance analysis system presents the user with a 'Client Regions' interface 600, shown in FIG. 6, in which the user selects the client operated locations across countries, locations and states. The interface 600 includes various tabs for different regions of the world, however different mechanism may be employed to allow the user to select the client operated locations.

Figure 7:
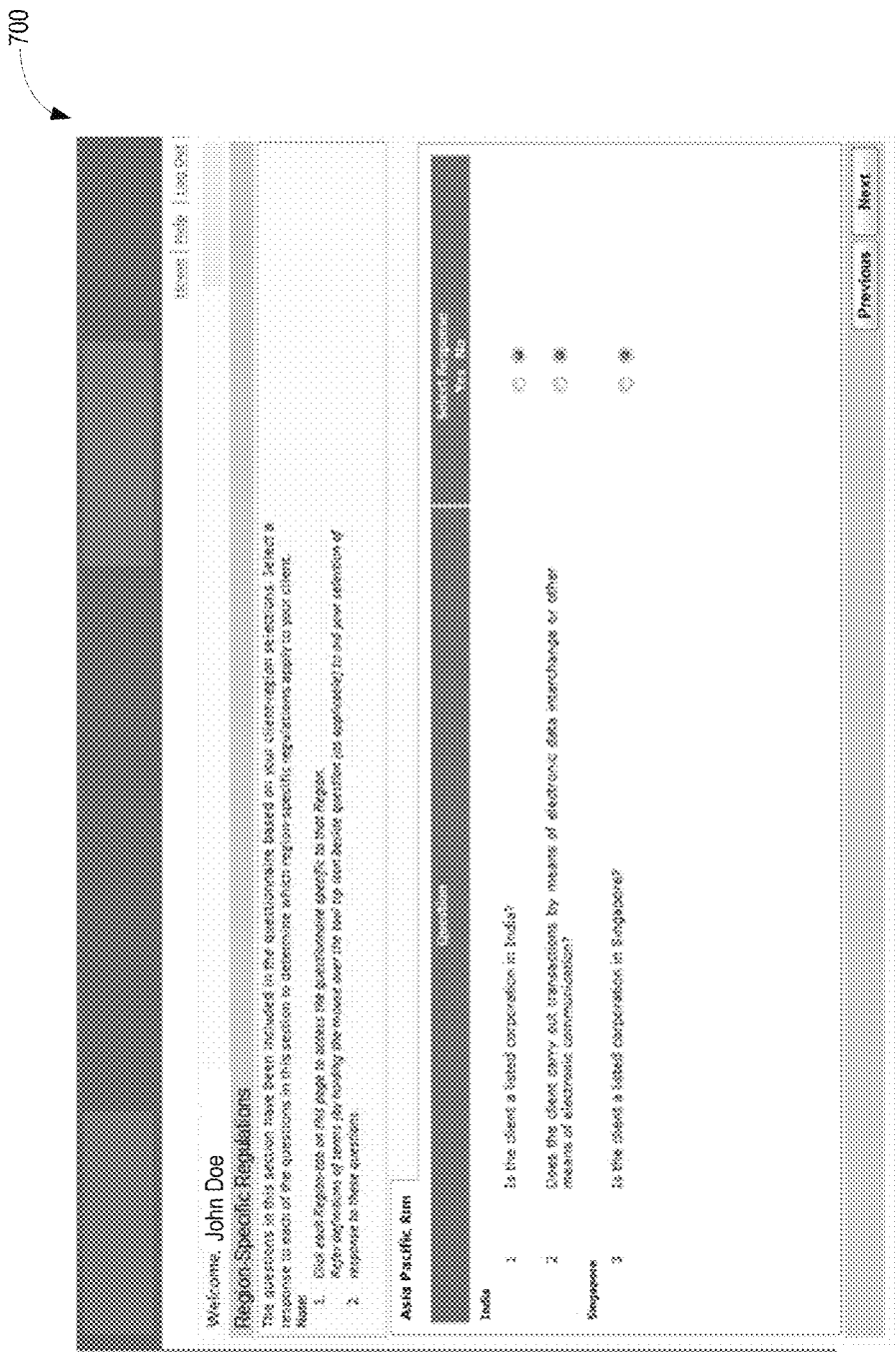

After the applicable locations are selected and the user selects the 'next' option, the security compliance analysis system security compliance analysis system presents the user with a 'Region Specific Regulations' interface 700, shown in FIG. 7. Based on the region selections made on the 'Client Region' selection page, the security compliance analysis system security compliance analysis system queries the SQL database to determine applicable questions corresponding to the specific regions selected. These applicable questions are rendered from the database to the 'Region-Specific Regulations' interface 700. The user responds to the questionnaire by choosing 'Yes-No' radio buttons provided. By default no may be selected for all the questions.

Figure 8:

After responding to the questionnaire rendered to the 'Region-Specific Regulations' interface 700, the security compliance analysis system presents the user with a 'Leading Practices' interface 800, shown in FIG. 8, for selecting leading practices that the user would like to include among the compliance requirements, such as NIST Guidance, IT Service Continuity Management, Incident response, Business Continuity etc. The leading practices may be displayed on custom data grids with collapse button to view complete questions and 'Yes No' radio buttons to respond. The leading practices presented on the 'Leading Practices' interface 800 may be customized to the prior selections made by the user on the 'Client Region' and "Region-Specific Regulations' interfaces 600 and 700.

Figure 9:
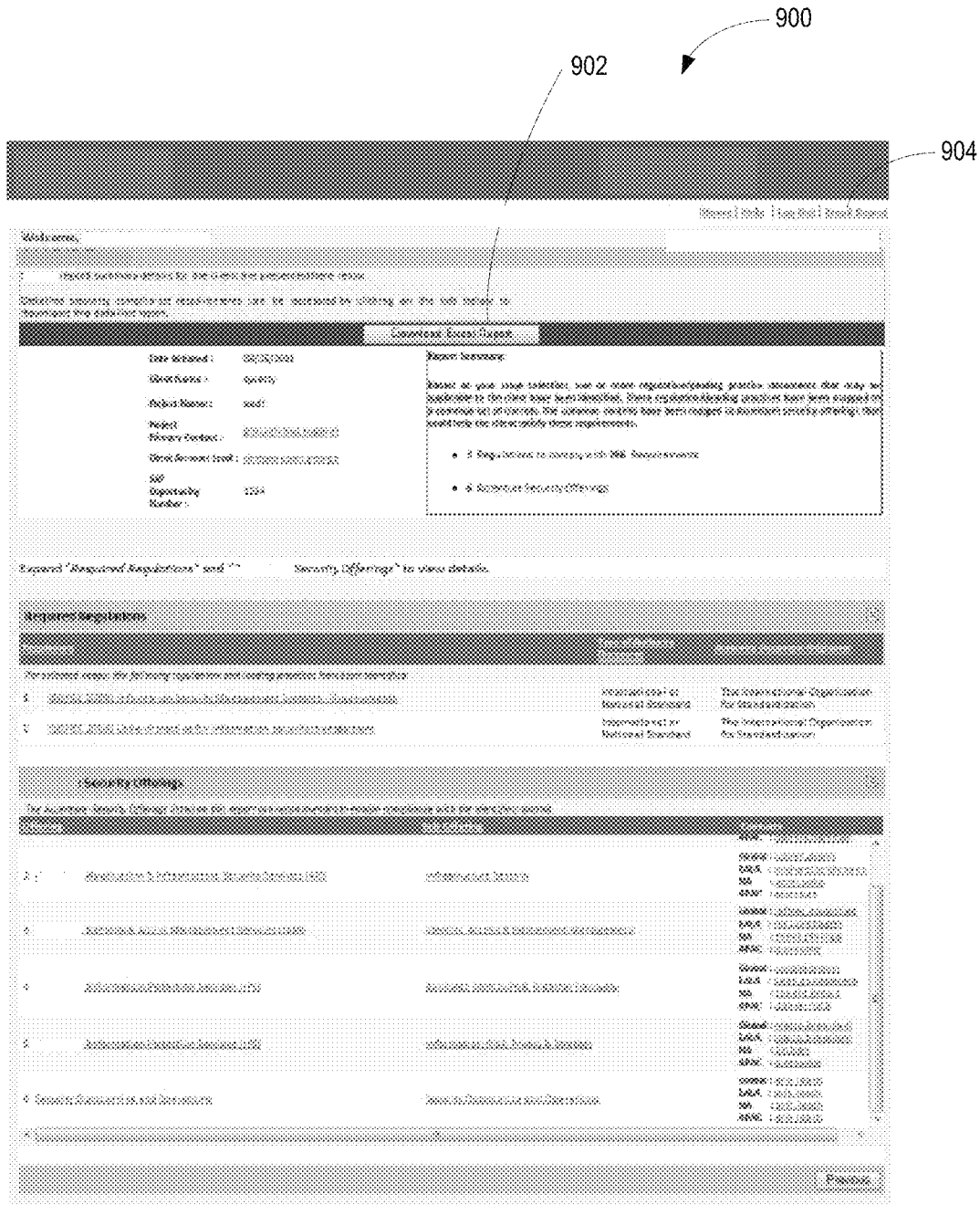

After the user selects the 'Submit' option at the bottom of the interface 900, the security compliance analysis system generates and presents to the user a report page 900, shown in FIG. 9, which includes a summarized report with user details, project name, date along with the report summary having the total number of applicable regulations and internal business security offerings. The report page 900 includes expandcollapse grids including the applicable regulations and internal business security offerings in detail. The security compliance analysis system may also transmit a notification email or SMS message to the user that generated the report.

The report page 900 includes a button 'Download Excel Report' 902 which, if selected, generates a report including all of the applicable regulations and controls in Excel® format. While the security compliance analysis system is described as generating the report in Excel® format for the sake of explanation, it will be understood that the security compliance analysis system may generate reports in other spreadsheet and document formats.

Figure 10:
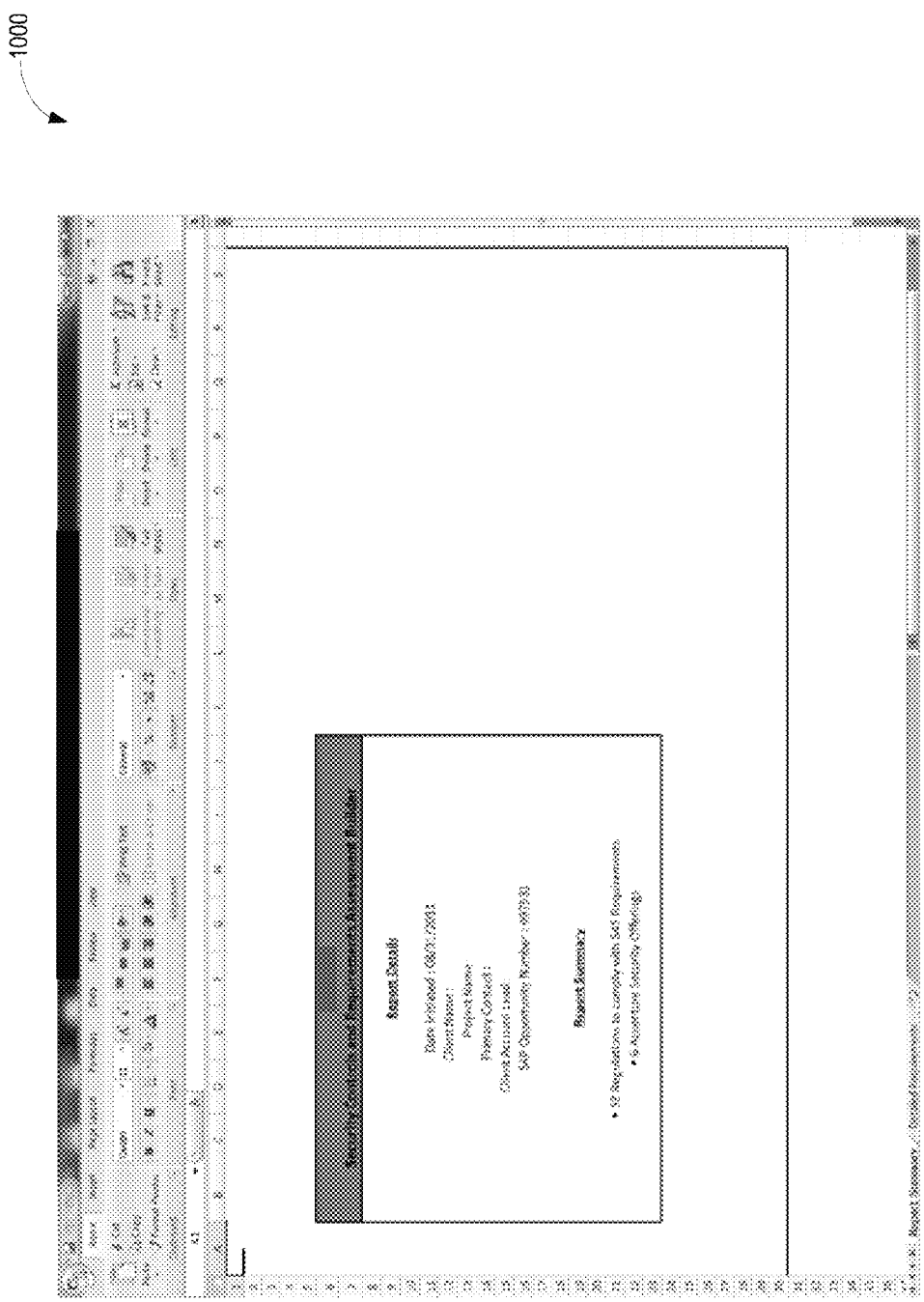
Figure 11:
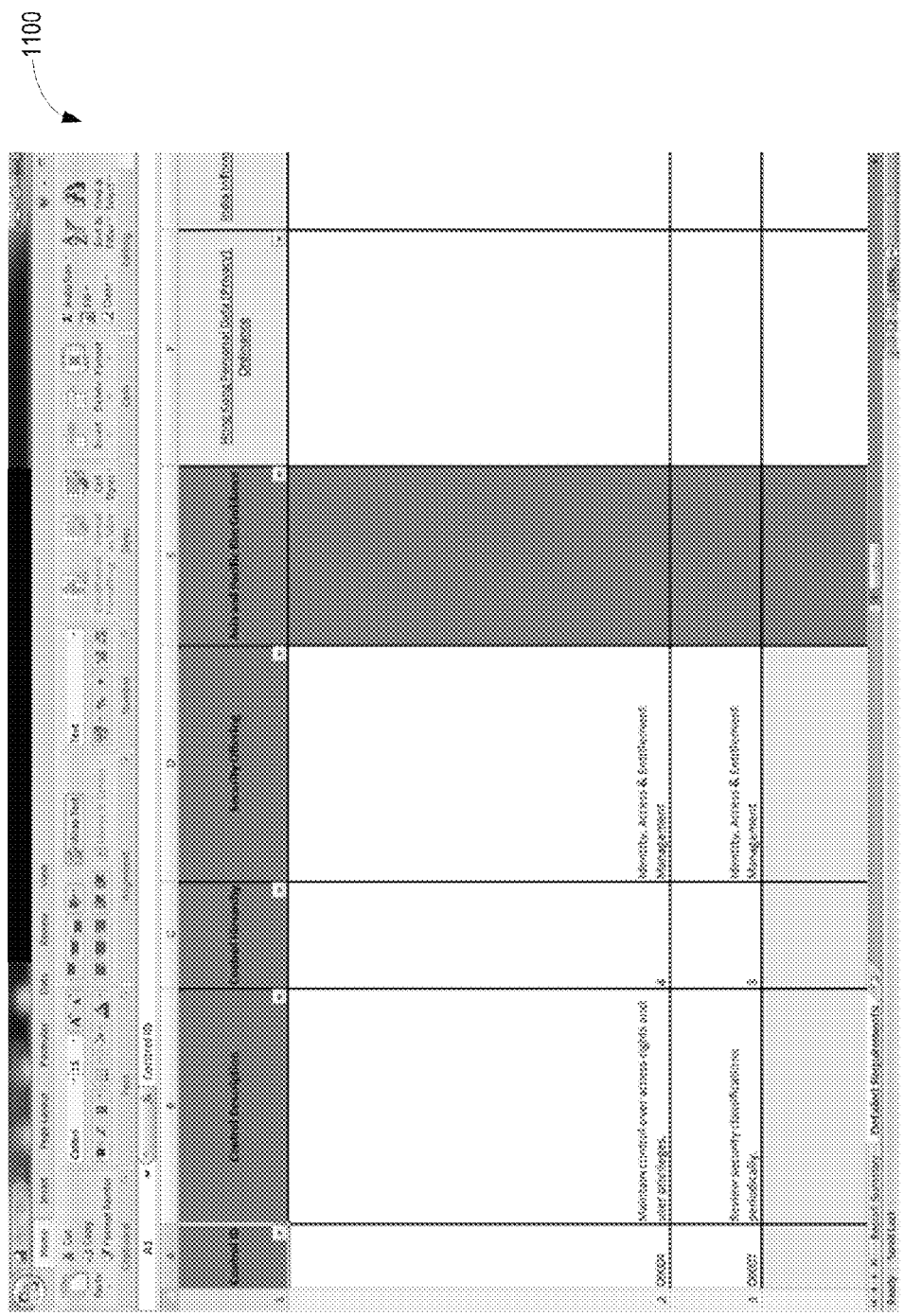

The Excel® document may include two sheets: a report summary sheet and detailed requirements sheet. FIG. 10 shows the report summary sheet 1000 and FIG. 11 shows the detailed requirements sheet 1100. The report summary sheet 1000 includes summary information such as the client and project name, primary contact, client account lead details, date generated, etc. The report summary sheet also includes the regulations that are applicable and internal business security offerings.

The detailed requirements sheet 1100 includes the applicable control IDs, control description, control hierarchy (control level), security offerings, and applicable leading practices. As shown in FIG. 11, the 'auto filter' option is enabled in the detailed requirements sheet 1100 for optimized searching.

The report page 1100 also includes an 'email report' option 1104. If selected, the security compliance analysis system generates a report include a summary of the report along with an attachment of the detailed excel report. FIG. 12 shows an example of a report email 1200 generated by the security compliance analysis system and send to the user.

Figure 13:
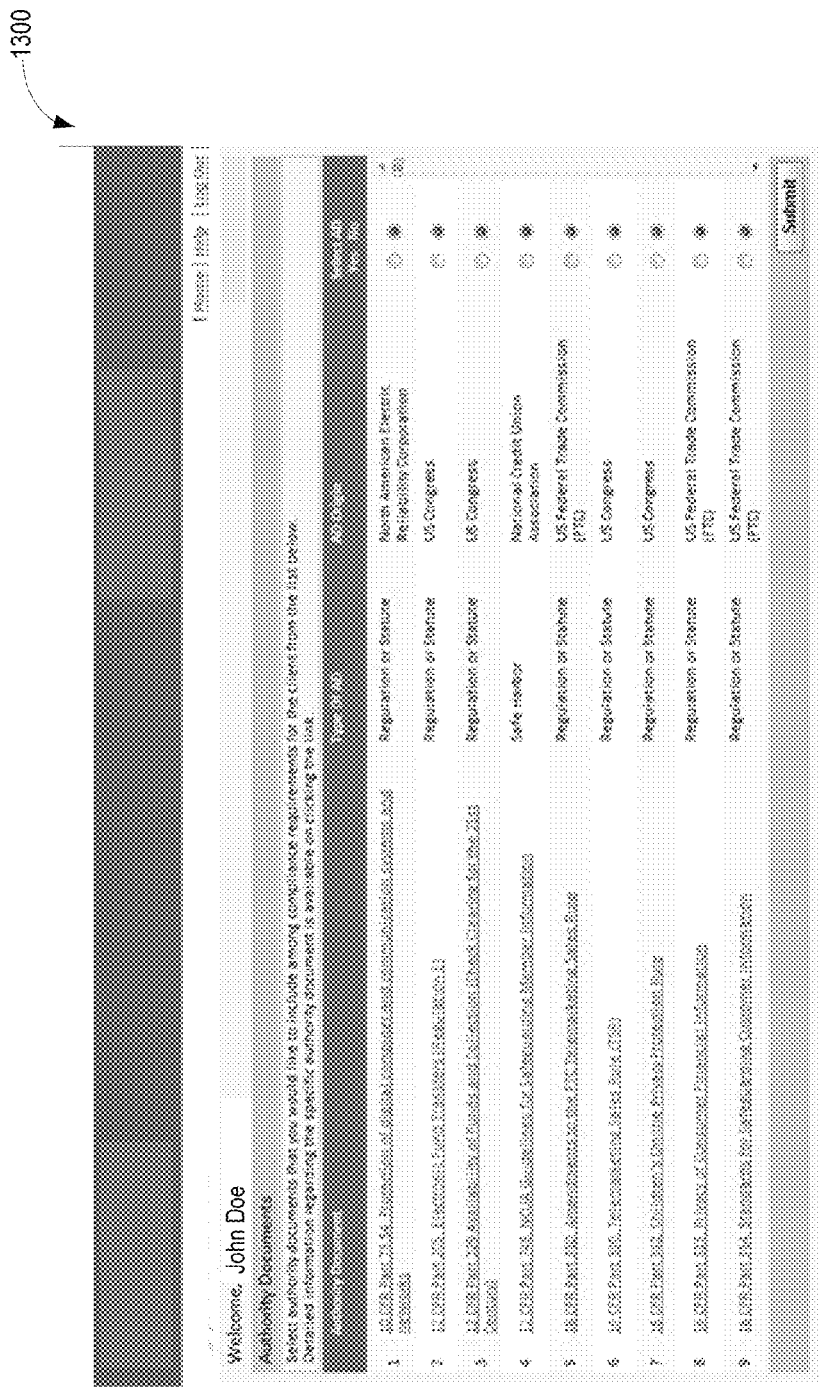
FIG. 13 illustrates an interface generated by a system for analyzing security compliance requirements security compliance analysis systems part of the Create New Report Using Expert Interface option shown in FIG. 4.

Referring back to the interface shown in FIG. 4, the user may also select the option 'Create New Report Using Expert Interface' 404. FIG. 13 shows examples of interfaces rendered by the security compliance analysis system if the user selections option 404. This option allows generation of a new report by an expert user that has a more complete knowledge on all the authority documents of the UCF. Initially the expert user would be presented with and fill in the project details page shown in FIG. 5. Following that page, the security compliance analysis system renders an 'Authority Documents' interface 1300, shown in FIG. 13, where the expert user can select all the applicable regulations that comply with client business and locations.

After the expert user makes and submits the authority document selections, the security compliance analysis system brings the user to the report page 900, shown in FIG. 9, on which the expert user may select the 'Download Excel Report' option 902 and/or the 'Email Report' option 904. If the expert user selects the 'Download Excel Report' option, security compliance analysis system may generate the Excel® document described above with respect to FIGS. 10 and 11. If the expert user selects the 'Email Report' option, the security compliance analysis system may generate the email report described above with respect to FIG. 12.

Figure 14:
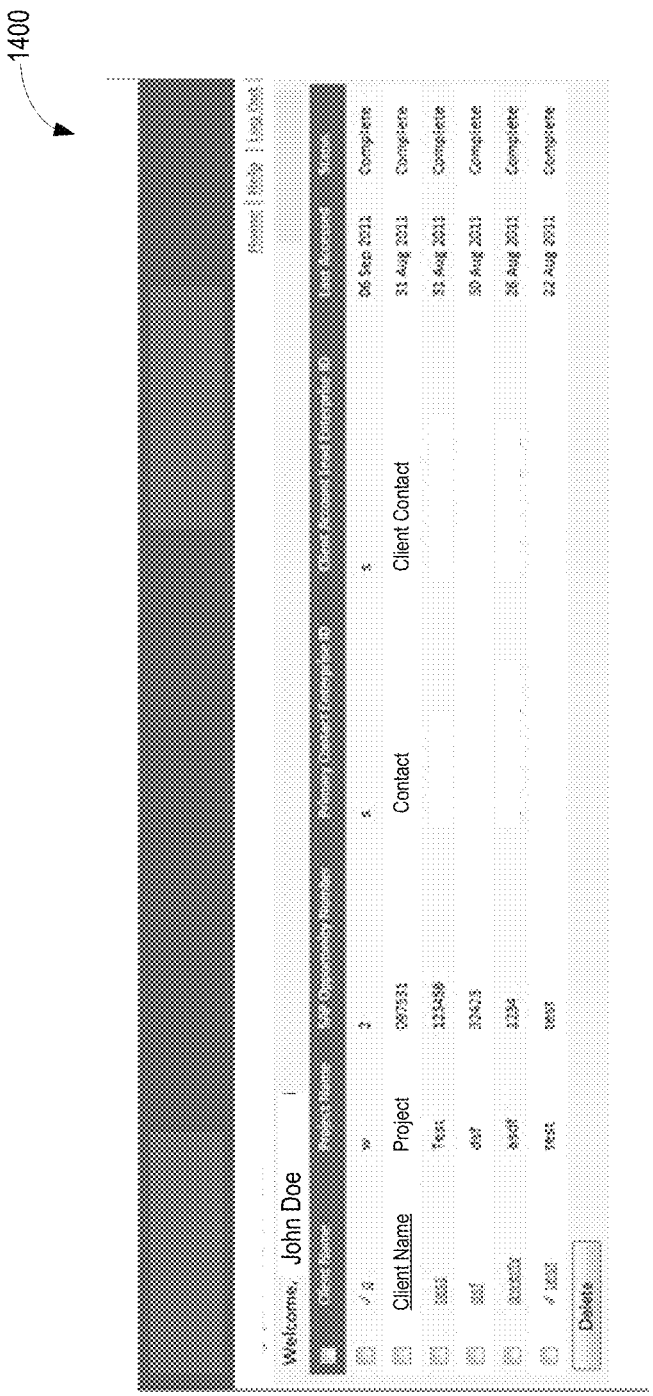
FIG. 14 illustrates an interface generated by a system for analyzing security compliance requirements security compliance analysis systems part of the View My Reports option shown in FIG. 4.

FIG. 14 shows an example of an interface 1400 rendered by the security compliance analysis system to view reports generated by the user according to the View My Reports 406 option discussed above with respect to FIG. 4. Selecting the View My Reports 406 option may allow the user to view reports previously generated by the user along with reports that are in progress. As shown in FIG. 14, a delete option is provided to delete generated reports or in-progress reports.

Figure 15:
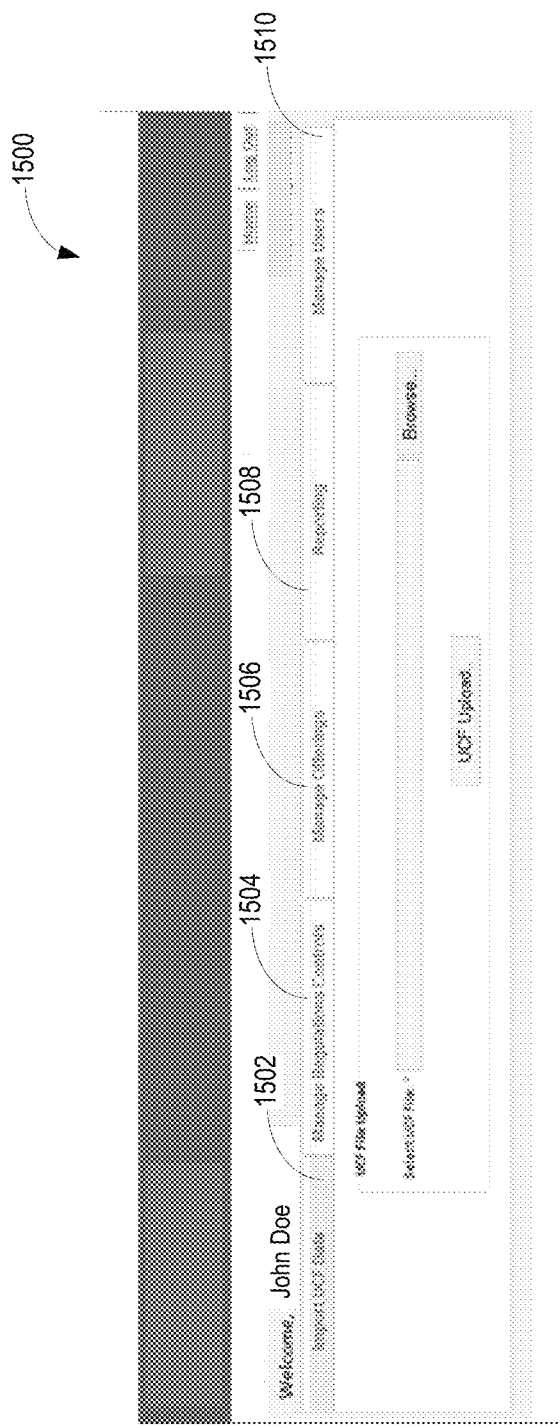
FIG. 15 illustrates an interface generated by a system for analyzing security compliance requirements security compliance analysis systems part of the Enter Admin Console option shown in FIG. 4.

FIGS. 15-27 illustrate the Enter Admin Console 408 option discussed above with respect to FIG. 4. FIG. 15 shows an interface 1500 of an administrative console rendered by the security compliance analysis system. The interface 1500 shows that the administrative console may include five sections which may be accessed by the following tabs shown in FIG. 16: import UCF data 1502, manage regulations controls 1504, manage offerings 1506, reporting 1508, and manage users 1510. In FIG. 15, the import UCF data 1502 tab is selected.

Through the interface 1500 the user may upload the UCF database to the SQL database of the security compliance analysis system. After uploaded, the security compliance analysis system may integrate the UCF data contained in the UCF database with the existing UCF data stored on the SQL database.

Figure 16:
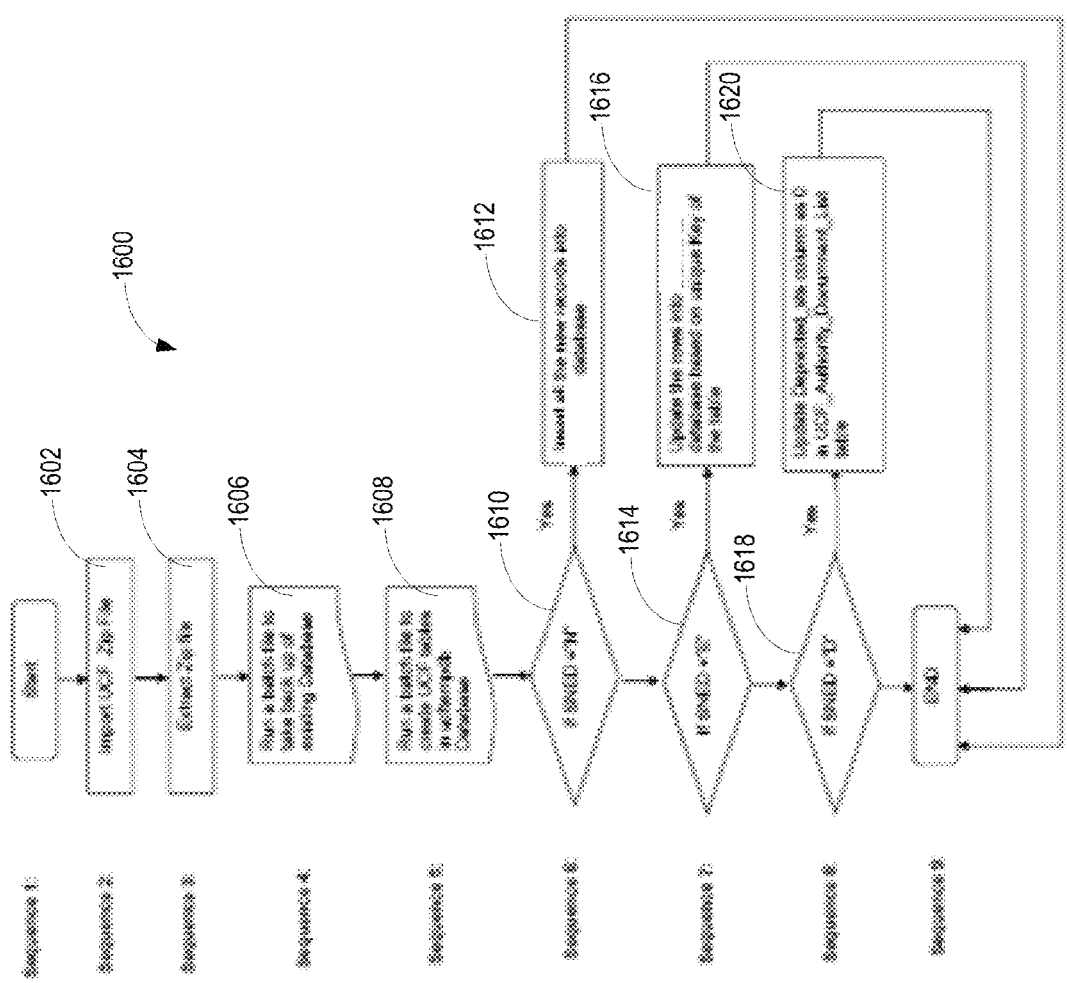
FIG. 16 shows an example of the process flow for importing new UCF data into the SQL database.

FIG. 16 shows an example of the process flow 1600 for importing new UCF data into the SQL database. The process 1600 imports the UCF file. (Step 1602). The UCF database file may be saved along with date and time details in the archive sub folder where extraction of data happens. If the UCF file is a .zip or other compressed file, the process 1600 extracts the UCF data from the compressed file. (Step 1604).

The process 1600 runs a batch file, 'Backupdb.bat' for generating a backup of the existing database used by the security compliance analysis system and saved as, for example, 'ucfdbbackup' with '.bak' extension. (Step 1606). C# code is written to copy three (UCF_Authority_Documents_List, UCF_CE_List, UCF_Citation_List) XML files to the xml folder of the UCF import. To delete all the remaining XSLT files except the three mentioned above from the SQL server import XSLT folder.

The process runs a UCF import batch file that move the above-mentioned three SQL files and their tables to UCF SQL file. (Step 1608). These three SQL files will run through a batch file named, for example, 'Run sql script. Bat', which is under a batch file folder.

The process 1600 executes a SQL stored procedure to compare the contents of the three above-referenced tables from the UCF database import with the existing database based on four conditions—SNED (S-same, N-new, E-edit, D-deprecated). The records that are same in both the databases are left untouched where we insert all the new records into the security compliance analysis system database.

In particular, the process 1600 identifies any records in the imported UCF database that are new. (Step 1610) For any imported database record determined to be new, the process 1600 causes the security compliance analysis system to insert each of the new records into the database. (Step 1612). The process 1600 identifies any records in the imported UCF database that are marked to be edits. (Step 1614). The records that are to be edited are updated. (Step 1616). The process 1600 identifies any records marked with 'ID', i.e., any records that have deprecated and which are hidden from the display to the users. (Step 1618). A depreciated record may correspond to a record that is no longer valid. For example when a law is repealed, the related regulations, standards, leading practices, etc. may no longer be valid. The process 1600 then updates the records according to the records identified as deprecated (Step 1620), such as by suppressing the deprecated record in the SQL database, or removing the record.

The disclosed methods, processes, programs, and/or instructions may be encoded in a signal-bearing medium, a computer-readable medium such as a memory, programmed within a device such as on one or more integrated circuits, or processed by a controller or a computer processor. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

Figure 17:
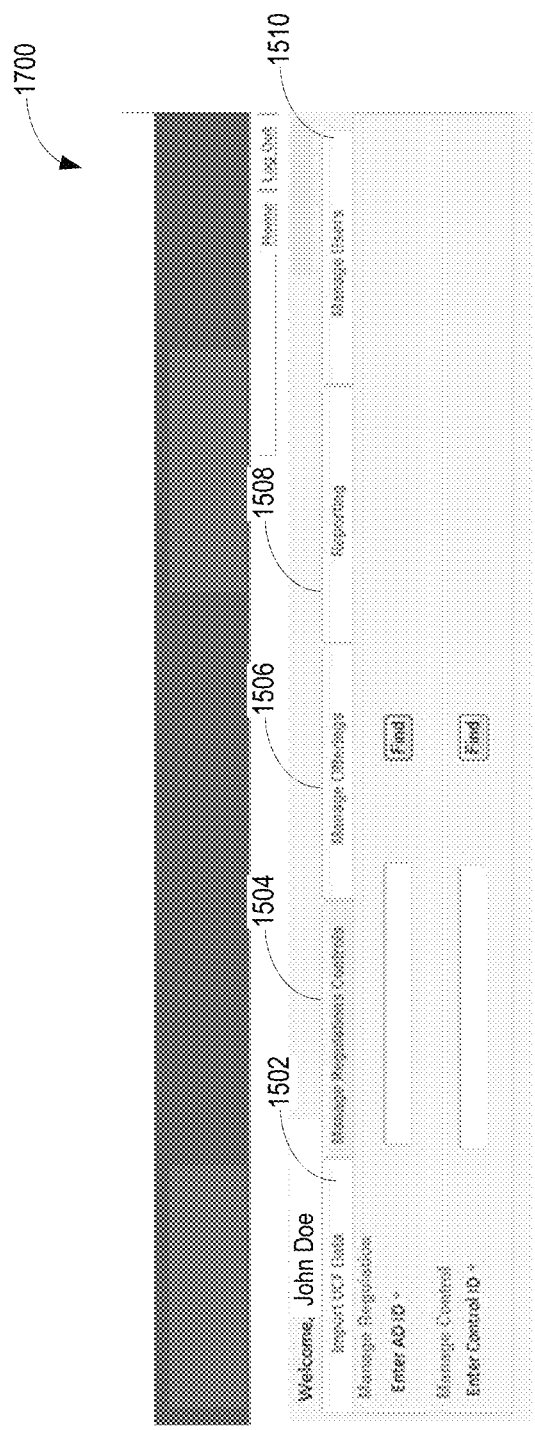

FIG. 17 shows an example of an interface 1700 in which the manage regulations controls tab 1504 of the administrative console is selected. To manage regulations, an administrator may enter the Authority Document ID (AD ID) and click on 'find' button.

Figure 18:
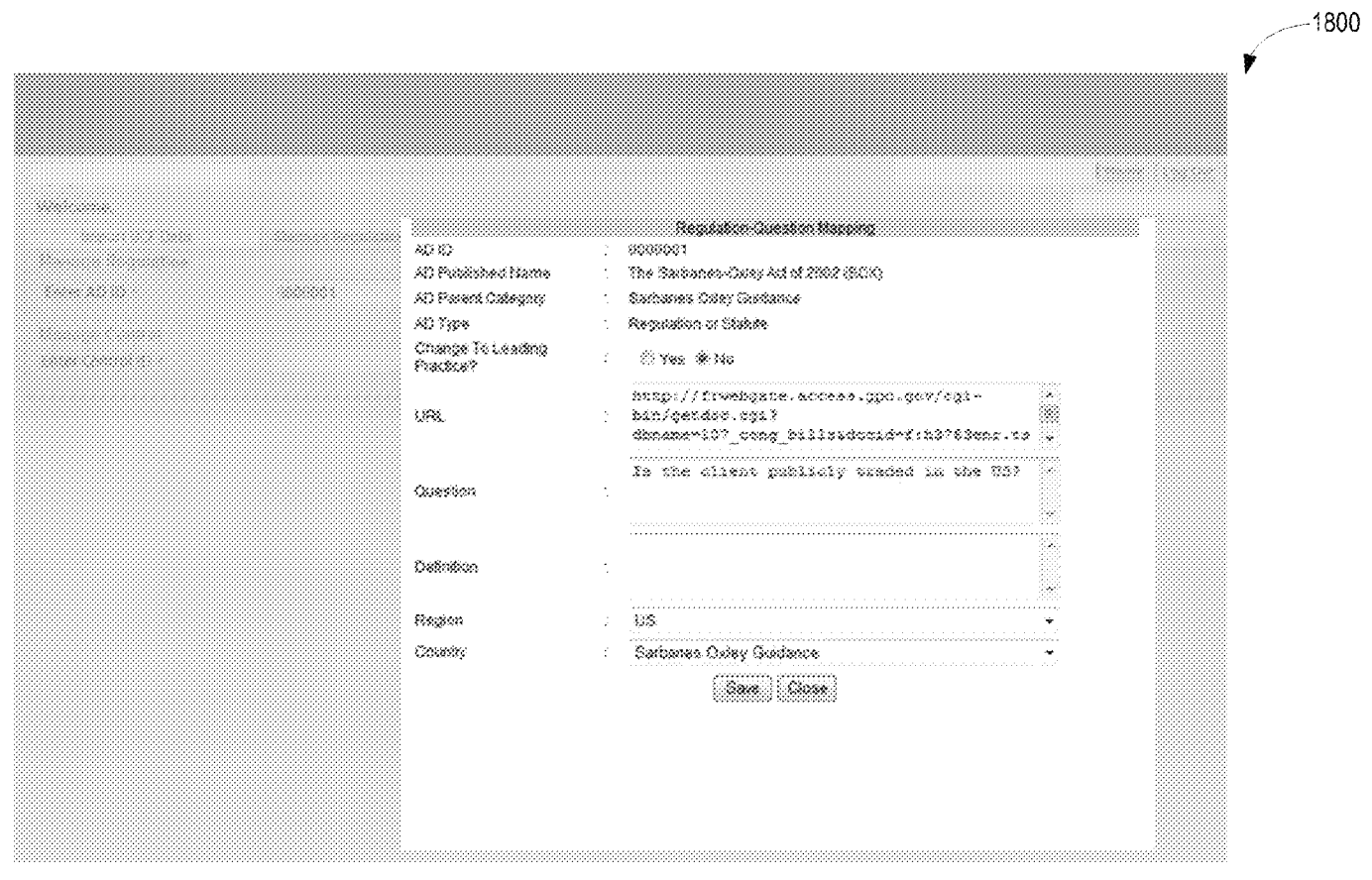
Figure 19:
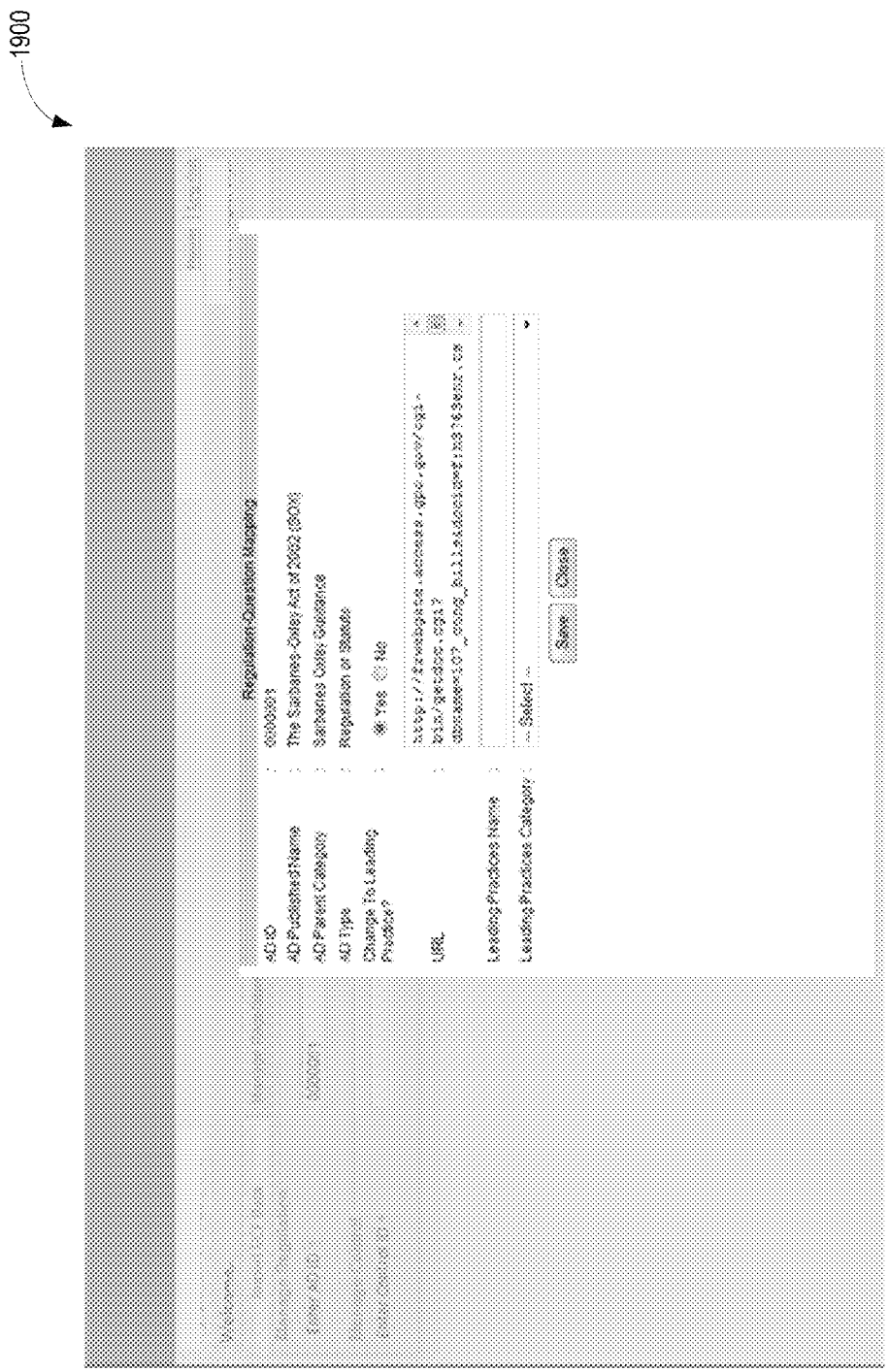

The security compliance analysis system may provide the interfaces 1800 and 1900 in FIGS. 18 and 19, respectively, to manage regulations-questions with AD ID, published name, parent category, type from the SQL database.

A question may be associated with a regulation, leading practice, law, security requirement, etc. If a definition exists for that particular regulation it is displayed in 'Definition' box. The administrator can add the definition to a regulation if there exists and can also modify it. For a given AD ID, the region and country that a particular regulation belongs to may be seen in the interface 1700. From drop down lists provided in the interface 1700, the administrator can change both the region and country of a regulation.

If the regulation will be identified as a leading practice and the option is made 'yes', then only URL, leading practices name and leading practices category fields will be displayed. The URL of that regulation in the window may be fetched from the database. If the leading practice option is made 'yes,' the security compliance analysis system may provide fields, as shown in FIG. 19, for the administrator may enter the leading practices name and select the leading practices category from the dropdown list provided.

Figure 20:
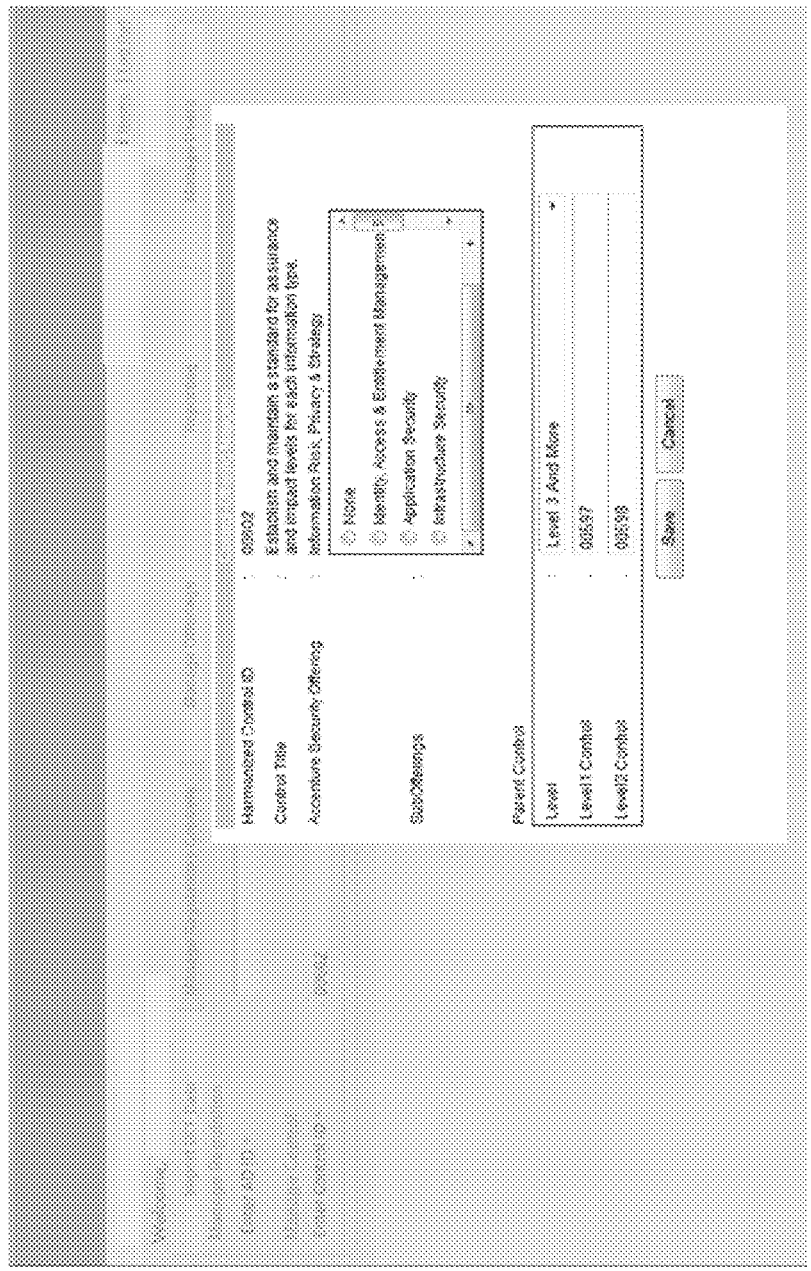
Figure 21:
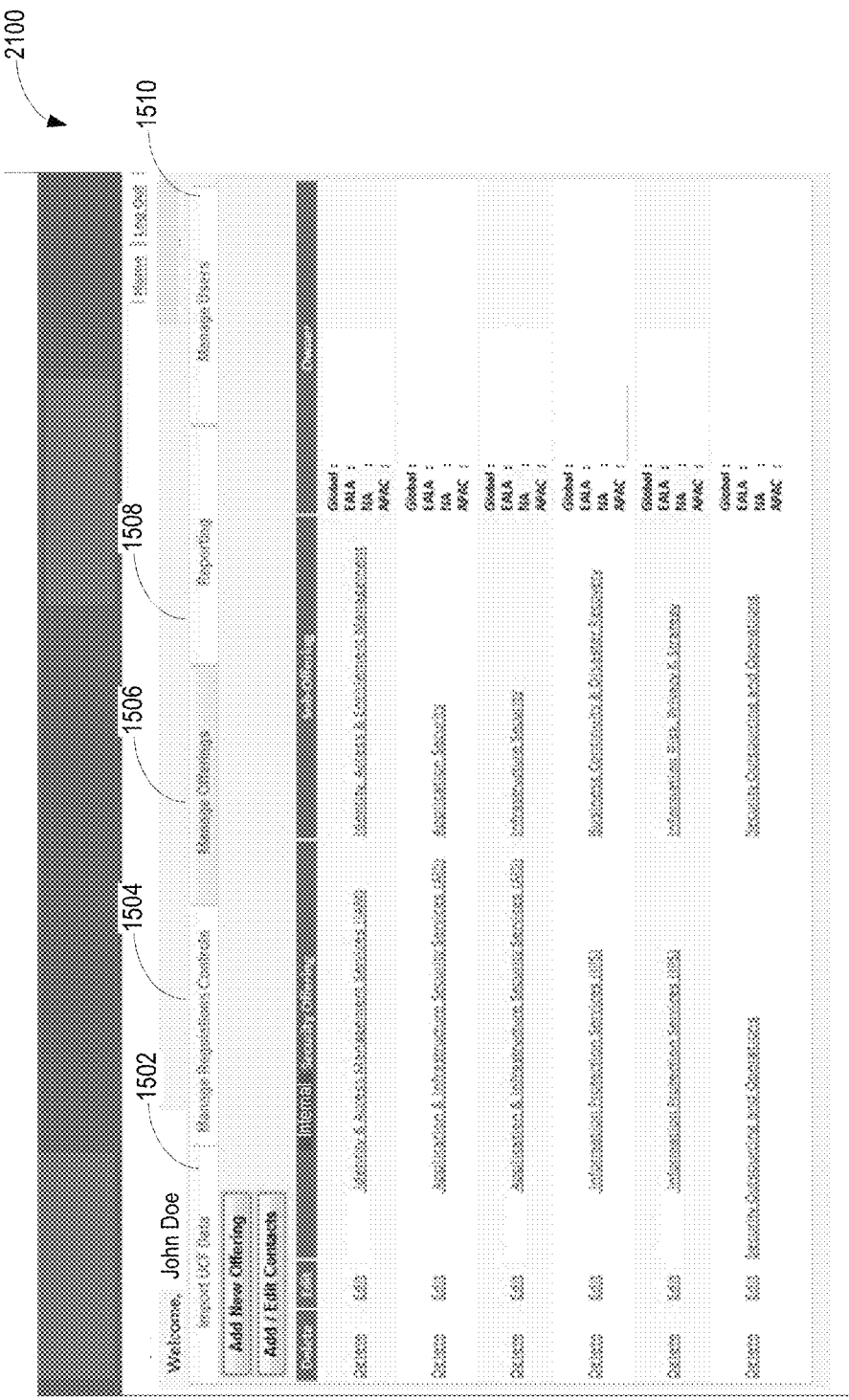

FIG. 20 shows an interface 2000 that may be rendered by the security compliance analysis system when the manage controls tab 1506 is selected. To manage a control, the administrator may input the 'control id' in the textbox and click 'find' button. A window titled 'control-offering mapping' may be rendered, as shown in FIG. 20, along with the control id, control title, company security offering, and parent control details. The administrator may change the sub offerings by clicking on the radio button, as well as the levels of the control. Changes made by the administrator are saved to the SQL database.

As part of the manage controls option 1506, the security compliance analysis system may render the interface 2100 which provides the administrator with the option to delete or edit each company security offering. The edit option allows the administrator to edit the existing security offering. If the administrator selects the edit options for a particular offering, the security compliance analysis system may render an 'Edit Offerings' pop-up window 2200 (shown in FIG. 22). The details of that particular offering such as URL, sub-offering and sub-offering URL are retrieved from the database. Editing of the existing details can be done in the editable textboxes provided in FIG. 22.

Figure 22:
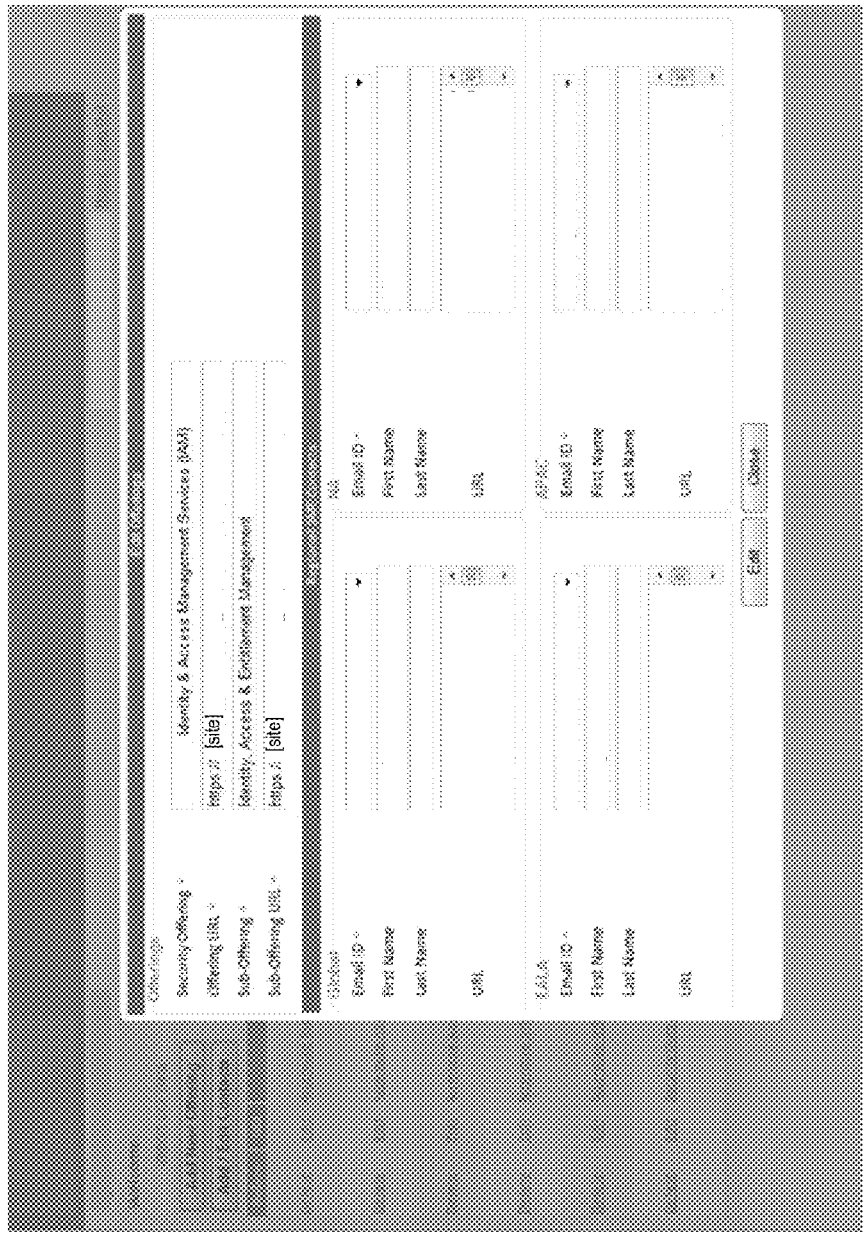
Figure 23:
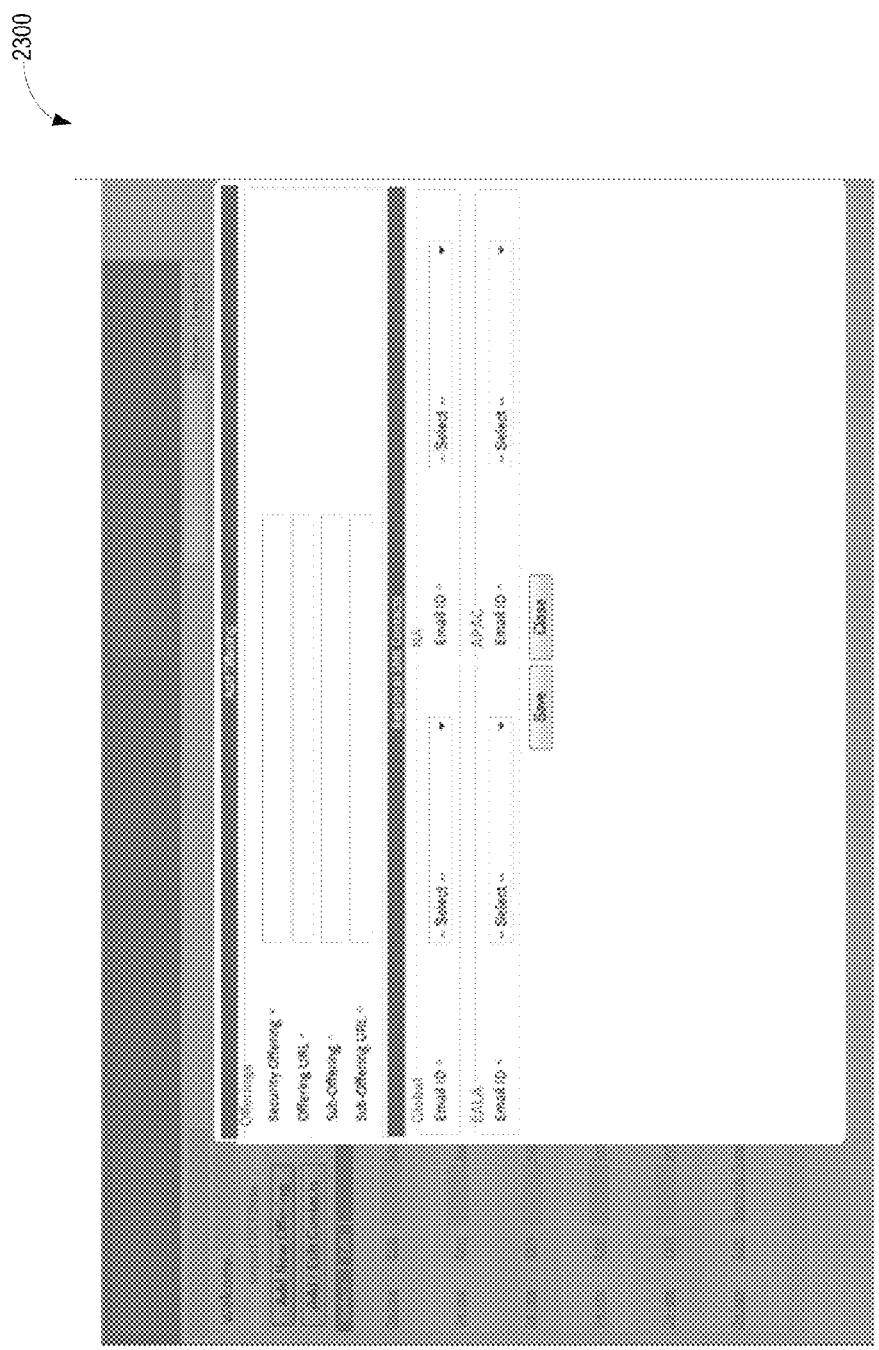

In the same window 2200, the administrator can edit the 'Regional SME Contacts' details also. As shown in FIG. 22, each of the four (Global, NA, EALA, APAC) regions are displayed with the entire email id, first and last name, URL of the SME profile in 'https://people.[host].com' web site. All the fields are in editable textboxes and can be edited.

The interface 2100 also provides the following additional options: Add New Offering, and Add/Edit Contacts. Upon selecting the 'Add New Offering' option, the security compliance analysis system may render the pop-up window shown in FIG. 23, which would initially be rendered with all the fields declared blank. The administrator can add the new offering by providing all the details like offering, URL, sub-offering and sub-offering URL in the text boxes. Regional SME Contacts can also be added by selecting the emails id's from all the four regions. Clicking on 'save' button will save all the details in to the database.

Figure 24:
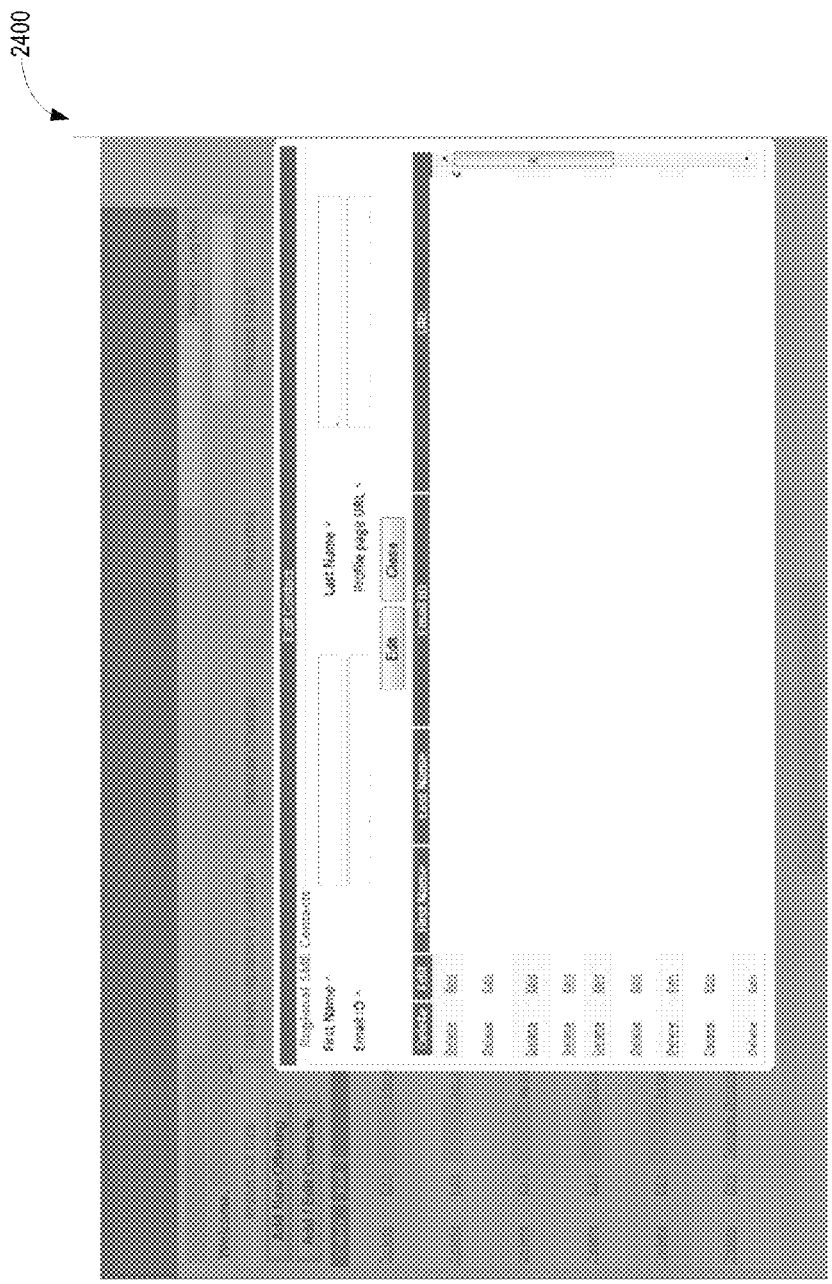

Upon selecting the 'Add/Edit Contacts' option, the security compliance analysis system may render the pop-up window 2400 shown in FIG. 24. In the window 2400 the administrator can edit add a new SME contact and edit an existing SME contact. The page will have all the first and last name of the contact, their email id and the url of their profile in 'https://people.[host].com' with edit and delete options against each contact. Clicking on delete prompts for the administrator for confirmation of whether to delete the contact info or not. After confirmation, the contact details will be permanently removed from the SQL database. When the edit button is selected, the details of that contact will be displayed in the editable text boxes above to edit. The contact details added and edited will be saved in the SQL database.

Figure 25:
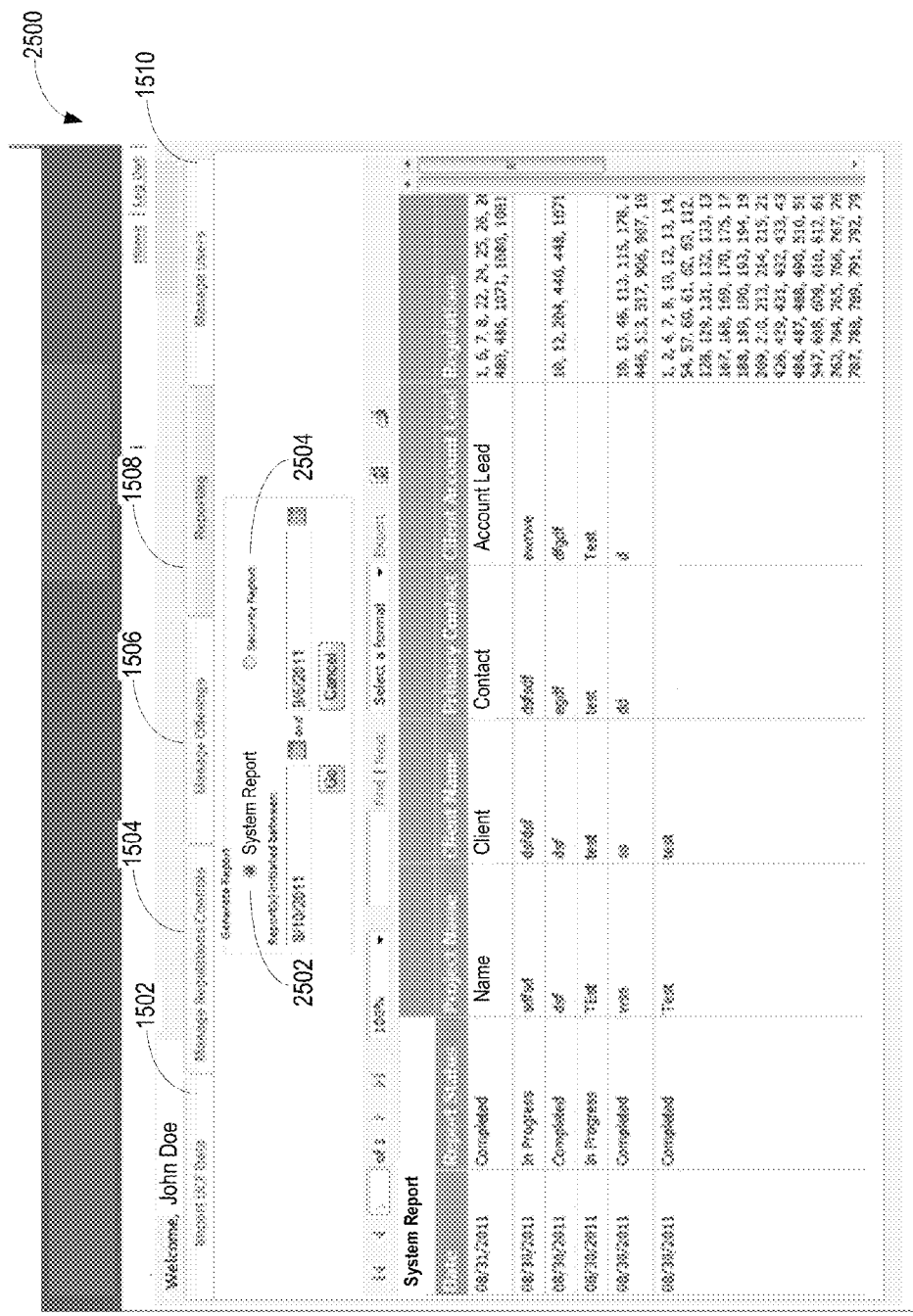
Figure 26:
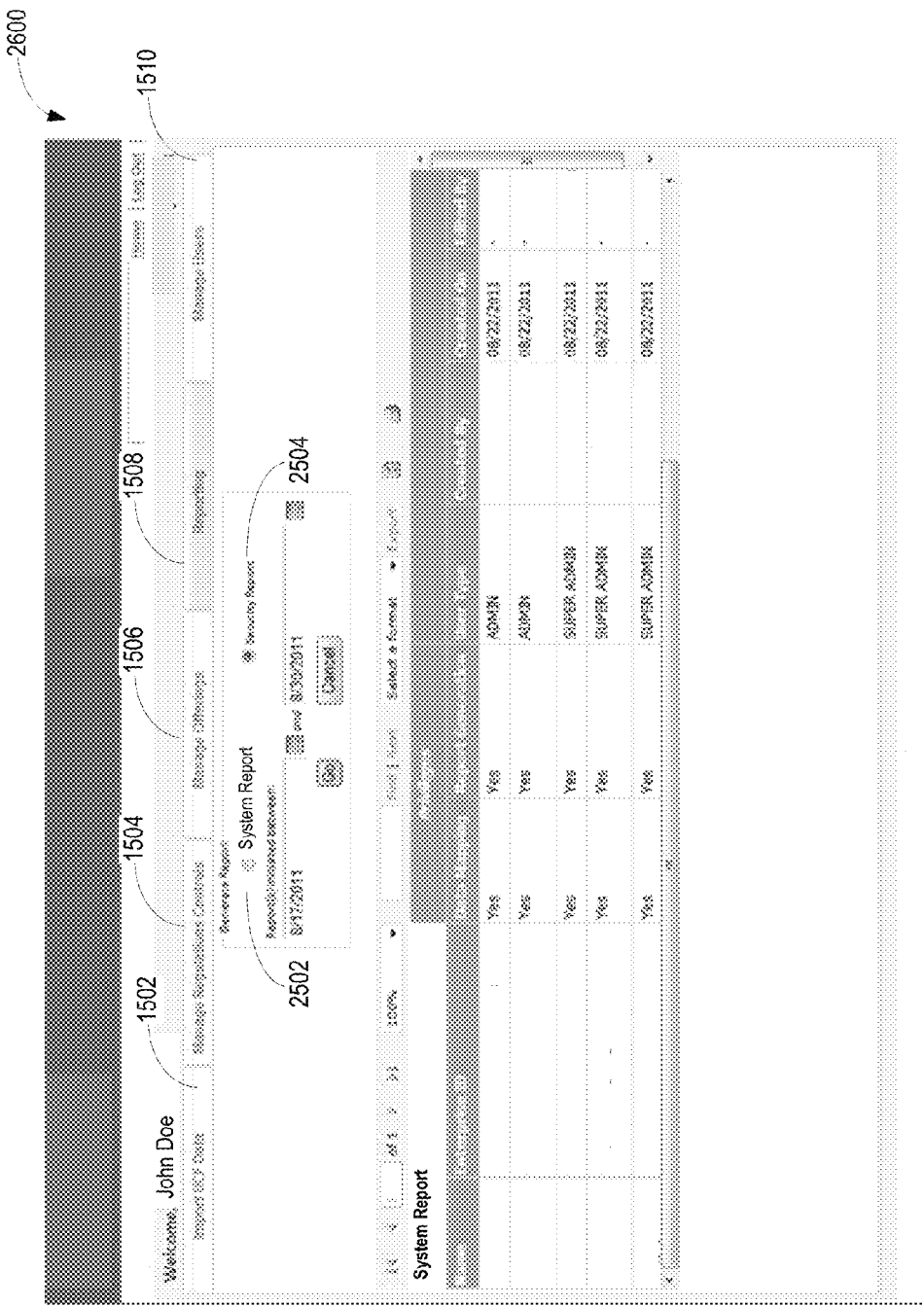

FIG. 25 shows an interface 2500 that may be rendered by the security compliance analysis system when the reporting tab 1508 of the administrative console is selected. The interface 2500 provides two options: system report 2502 and Security Report 2504. In FIG. 25 the system report 2502 option is selected. FIG. 26, described below, shown an interface 2600 in which the Security Report option 2504 is selected.

In the interface 2500 security compliance analysis system displays the reports generated between a particular period based on 'from' and 'to' dates that may be selected by the administrator. The security compliance analysis system may display a consolidated list of all the reports for that selected period along with a status of each report, including whether it is in progress or completed. The interface 2500 also provides a pane zoom option along with refresh, print and export options. To export the report list, the administrator may select a preferred format (Excel or Pdf) and click on 'Export': the security compliance analysis system will then generate the list in the selected format. The interface 2500 also provides a 'print' option to print the consolidated report.

In the interface 2600 shown in FIG. 26, the Security Report option 2504 is selected. A selection may be made by selecting 'from' and 'to' dates indicating a particular period of time. The security compliance analysis system may display the security report, comprising the user names, enterprise id, privileges, user type, created by and created date, edited by and edited date along with deleted by and deleted date. As the with the report page 2500, a zoom option is provided in addition to the export and print option.

Figure 27:
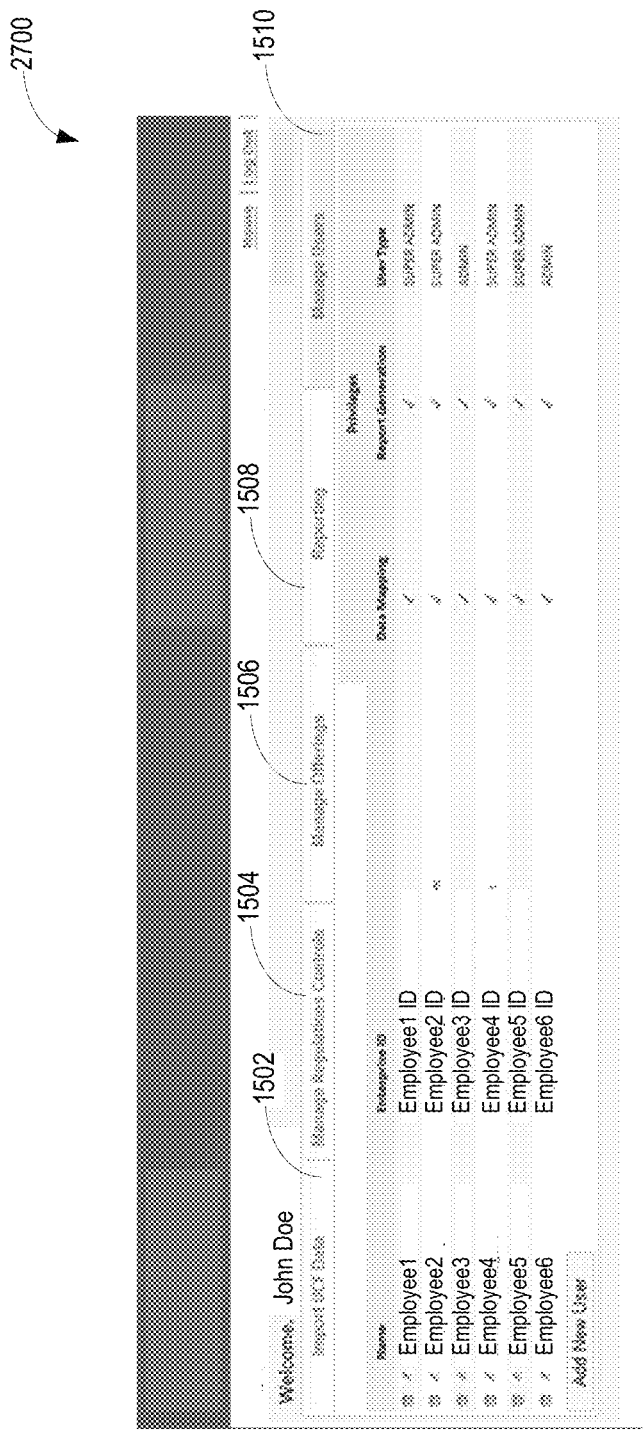

FIG. 27 shows an interface 2700 that may be rendered by the security compliance analysis system when the manage users tab 1510 of the administrative console is selected. The interface 2700 allows the administrator to manage the users listed on the page. The interface 2700 includes an 'Add New User' button that, if selected, allows the administrator to add a new user and specify the user type, whether user can be an 'Admin', 'Security Expert' or 'Super Admin' by providing the name and enterprise id.

The user that is going to be assigned as an administrator may have privileges for data mapping and report generation. A security expert may be authorized to access the expert interface and a super administrator will have control to all user interfaces rendered by the system. A 'Save' button is provided to save the newly added list to the database. In some embodiments, only the 'Super Admin' will have the rights to delete the users with the 'delete' button provided against each user.

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A product comprising:
a memory;
instructions stored in the memory that, when executed, cause a computer processor to:
obtain preliminary data from a user defining a business offering and at least one geographic region associated with the business offering;
generate a multi-tiered question set based on the preliminary data, comprising:
generating a custom set of first tier questions customized to the at least one geographic region associated with the business offering based on the preliminary data and obtaining a set of answers in response to the custom set of first tier questions from the user;
generating a first database query based on the set of answers to the custom set of first tier questions from the user;
querying a database based on the generated first database query, wherein the database returns security compliance requirements information;
generating a custom set of second tier questions customized to the set of answers to the custom set of first tier questions and obtaining a set of answers to the custom set of second tier questions;
generate a second database query based on the preliminary data and the sets of answers to the custom set of first tier questions and the custom set of second tier questions;
querying the database based on the generated second database query;
obtaining from the queried database, in response to the second database query, a set of configuration control requirements imported from a unified compliance framework (UCF) database and tailored to the business offering,
wherein the queried database comprises the set of configuration control requirements, authority documents and authority document's citations,
wherein the UCF database comprises the set of configuration control requirements and other configuration control requirements,
wherein the set of configuration control requirements and other configuration control requirements comprise behavioral and/or procedural requirements for the business offering and other business offerings, respectively;
providing the results to the user; and
integrating the other configuration control requirements from the UCF database with the queried database by:
importing, through a communications interface, a UCF file comprising the other configuration control requirements, wherein the other configuration control requirements comprise new configuration control requirements;
identifying a file type of the UCF file from multiple file types including a compressed file type and uncompressed file type, and:
when the file type of the UCF file is a compressed file type, extracting the other configuration control requirements from the UCF file;
identifying the new configuration control requirements by:
comparing the other configuration control requirements with the authority documents and the authority document's citations in the queried database; and
determining that the new configuration control requirements are not identified by the authority documents and the authority document's citations; and
inserting the new configuration control requirements into the queried database.

2. The product of claim 1, wherein the custom set of second tier questions comprise questions related to industry leading practices.

3. The product of claim 1, wherein the database further comprises security requirements corresponding to internal business practices corresponding to the business offering, wherein the internal security requirements are integrated with data imported from an external database.

4. The product of claim 1, wherein each question of the custom sets of first and second tier questions is mapped to at least one security compliance requirement obtained via a database query.

5. The product of claim 1, wherein the set of configuration control requirements comprises attributes of security requirements for the business offering.

6. A system for security compliance and analysis requirements building, comprising:
   a computer processor; and
   a memory connected with the processor, the memory comprising instructions that, when executed, cause the computer processor to:
      obtain preliminary data from a user defining a business offering and at least one geographic region associated with the business offering;
      generate a multi-tiered question set based on the preliminary data, comprising:
         generating a custom set of first tier questions customized to the at least one geographic region associated with the business offering based on the preliminary data and obtaining a set of answers to the custom set of first tier questions from the user;
         generating a first database query based on the set of answers to the custom set of first tier questions from the user;
         querying a database based on the generated database query and obtaining security compliance requirements information as a result of the query;
         generating a custom set of second tier questions customized to the set of answers to the custom set of first tier questions and obtaining a set of answers to the custom set of second tier questions;
      generate a second database query based on the preliminary data and the sets of answers to the custom set of first tier questions and the custom set of second tier questions;
      querying the database based on the generated second database query;
      obtaining from the queried database a set of configuration control requirements imported from a unified compliance framework (UCF) database in response to the second database query that are tailored to the business offering,
         wherein the queried database comprises the set of configuration control requirements, authority documents and authority document's citations,
         wherein the UCF database comprises the set of configuration control requirements and other configuration control requirements,
         wherein the set of configuration control requirements and other configuration control requirements comprise behavioral and/or procedural requirements for the business offering and other business offerings, respectively;
      providing the results to the user; and
      integrating other configuration control requirements from the UCF database with the queried database by:
         importing, through a communications interface, a UCF file comprising the other configuration control requirements, wherein the other configuration control requirements comprise new configuration control requirements;
         identifying a file type of the UCF file from multiple file types including a compressed file type and uncompressed file type, and:
            when the file type of the UCF file is a compressed file type, extracting the other configuration control requirements from the UCF file;
         identifying the new configuration control requirements by:
            comparing the other configuration control requirements with the authority documents and the authority document's citations in the queried database; and
            determining that the new configuration control requirements are not identified by the authority documents and the authority document's citations; and
         inserting the new configuration control requirements into the queried database.

7. The system of claim 6, wherein the second tier questions comprise questions related to industry leading practices.

8. The system of claim 6, wherein the database comprises data imported from an external database.

9. The system of claim 8, wherein the database further comprises security requirements corresponding to internal business practices corresponding to the business offering, wherein the internal security requirements are integrated leading practice and regulatory compliance data.

10. The system of claim 8, wherein each question of the custom sets of first and second tier questions is mapped to at least one security requirement obtained via a database query.

11. The system of claim 6, wherein the set of configuration control requirements comprises attributes of security requirements for the business offering.

12. A method for security compliance and analysis requirements building, comprising:
   obtaining preliminary data from a user defining a business offering and at least one geographic region associated with the business offering;
   generating, using a computer processor, a multi-tiered question set based on the preliminary data, comprising:
      generating a custom set of first tier questions customized to the at least one geographic region associated with the business offering based on the preliminary data and obtaining a set of answers in response to the custom set of first tier questions from the user;
      generating a first database query based on the set of answers to the custom set of first tier questions from the user;
      querying a database based on the generated first database query, and obtaining as an output security compliance requirements information;
      generating a custom set of second tier questions customized to the set of answers to the custom set of first tier questions and obtaining a set of answers to the custom set of second tier questions, wherein the custom set of second tier questions is different for different sets of first tier questions;
   generating, using the computer processor, a second database query based on the preliminary data and the sets of answers to the custom set of first tier questions and the second tier questions;
   querying, using the computer processor, the database based on the generated second database query;
   obtaining from the queried database a set of configuration control requirements imported from a unified compliance framework (UCF) database in response to the second database query that are tailored to the business offering, wherein the queried database comprises the set of configuration control requirements, authority documents and authority document's citations, wherein the UCF database comprises the set of configuration control requirements and other configuration control requirements, wherein the set of configuration control requirements and other configuration control requirements comprise behavioral and/or procedural requirements for the business offering and other business offerings, respectively;

transmitting the results to the user; and integrating other configuration control requirements from the UCF database with the queried database by:

importing, through a communications interface, a UCF file comprising the other configuration control requirements, wherein the other configuration control requirements comprise new configuration control requirements;

identifying a file type of the UCF file from multiple file types including a compressed file type and uncompressed file type, and:

when the file type of the UCF file is a compressed file type, extracting the other configuration control requirements from the UCF file;

identifying the new configuration control requirements by:

comparing the other configuration control requirements with the authority documents and the authority document's citations in the queried database; and determining that the new configuration control requirements are not identified by the authority documents and the authority document's citations; and inserting the new configuration control requirements into the queried database.

13. The method of claim 12, wherein the second tier questions comprise questions related to industry leading practices.

14. The method of claim 12, wherein the database comprises data imported from an external database.

15. The method of claim 14, wherein the database further comprises security requirements corresponding to internal business practices corresponding to the business offering, wherein the internal security requirements are integrated with leading practice and regulatory compliance requirements data.

16. The method of claim 14, wherein each question of the custom sets of first and second tier questions is mapped to at least one security requirement obtained via a database query.

17. The method of claim 12, wherein the set of configuration control requirements comprises attributes of security requirements for the business offering.

* * * * *